(12) United States Patent
Maher et al.

(10) Patent No.: US 11,867,148 B2
(45) Date of Patent: Jan. 9, 2024

(54) DELIVERY OF A HIGH VOLUME OF FLOATING SYSTEMS FOR WIND TURBINES

(71) Applicant: TRENDSETTER VULCAN OFFSHORE, INC., Houston, TX (US)

(72) Inventors: James V Maher, Houston, TX (US); Kim Mittendorf, Houston, TX (US)

(73) Assignee: Trendsetter Vulcan Offshore, Inc., Houston, TX (US)

( * ) Notice: Subject to any disclaimer, the term of this patent is extended or adjusted under 35 U.S.C. 154(b) by 9 days.

(21) Appl. No.: 17/672,674

(22) Filed: Feb. 15, 2022

(65) Prior Publication Data

US 2022/0260058 A1 Aug. 18, 2022

Related U.S. Application Data

(60) Provisional application No. 63/224,463, filed on Jul. 22, 2021, provisional application No. 63/149,607, filed on Feb. 15, 2021.

(51) Int. Cl.
*F03D 13/25* (2016.01)
*E02B 17/02* (2006.01)
(Continued)

(52) U.S. Cl.
CPC ............ *F03D 13/25* (2016.05); *B63B 35/003* (2013.01); *F03D 13/10* (2016.05);
(Continued)

(58) Field of Classification Search
CPC ..... E02B 2017/0091; E02B 2017/0039; E02B 2017/0043; E02B 2017/0047; F03D 13/10; F03D 13/25; B63B 2035/446
See application file for complete search history.

(56) References Cited

U.S. PATENT DOCUMENTS 7,156,037 B2 * 1/2007 Borgen ................. E02D 27/425
290/44
7,413,382 B2 8/2008 Hedstrom et al.
(Continued)

FOREIGN PATENT DOCUMENTS

CN      102442409 A  *  5/2012
CN      112283043 A  *  1/2021
(Continued)

OTHER PUBLICATIONS

J. Hogan et al., Red Hawk Cell Spar Hull Fabrication, Offshore Technology Conference, Houston, Texas, May 2, 2005, 2 pages.
(Continued)

*Primary Examiner* — Frederick L Lagman
(74) *Attorney, Agent, or Firm* — Jonathan Pierce; Pierre Campanac; Porter Hedges LLP

(57) ABSTRACT

Delivery of a high volume of floating systems for wind turbines can make floating wind economic. The delivery can involve the standard design of sections, such as "tubes" or "cans," comprising a rolled plate and ring stiffeners. The delivery can then involve the transportation of the sections in block to an assembly site that is closer to the planned installation point. The sections are used to manufacture floating vessels, such as semi-submersibles, buoyant towers, and/or spars, at the assembly site, which can include a barge with cranes. For semi-submersibles, the delivery can then involve the installation of the Tower, the nacelle, and blades using the barge cranes. Alternatively, for spars or buoyant towers, the nacelle and blades can be installed at an off-shore location using a platform, such as a standard jack-up vessel or a crane jacket.

29 Claims, 26 Drawing Sheets

(51) Int. Cl.
*F03D 13/10* (2016.01)
*B63B 35/00* (2020.01)
B63B 35/44 (2006.01)
E02B 17/00 (2006.01)

(52) U.S. Cl.
CPC . *B63B 2035/446* (2013.01); *E02B 2017/0039* (2013.01); *E02B 2017/0091* (2013.01); *F05B 2240/95* (2013.01)

(56) References Cited

U.S. PATENT DOCUMENTS

| | | | |
|---|---|---|---|
| 7,413,384 B2 | 8/2008 | Horton, III et al. | |
| 7,508,088 B2 | 3/2009 | Kothnur et al. | |
| 8,689,721 B2* | 4/2014 | Wang | B63B 35/44 |
| | | | 114/264 |
| 8,770,126 B2* | 7/2014 | Nielsen | F03D 13/40 |
| | | | 114/123 |
| 9,394,035 B2* | 7/2016 | Dagher | B63B 75/00 |
| 9,457,873 B2* | 10/2016 | Nagurny | B63B 35/44 |
| 9,523,355 B2 | 12/2016 | Taub | |
| 9,856,621 B2* | 1/2018 | Johnson, Jr. | E02D 27/525 |
| 10,087,915 B1 | 10/2018 | Srinivan | |
| 10,781,081 B2* | 9/2020 | Kersten | B66C 13/16 |
| 11,204,018 B2* | 12/2021 | Nielsen | F03D 7/0292 |
| 11,231,015 B2* | 1/2022 | Helmens | F03D 13/25 |
| 2005/0163616 A1* | 7/2005 | Mortensen | F03D 13/10 |
| | | | 416/132 B |
| 2008/0044235 A1 | 2/2008 | Horton et al. | |
| 2010/0067989 A1* | 3/2010 | Brown | B63B 35/003 |
| | | | 405/196 |
| 2011/0074155 A1 | 3/2011 | Scholte-Wassink | |
| 2012/0000071 A1* | 1/2012 | Harris | F03D 80/50 |
| | | | 29/889 |
| 2012/0037265 A1 | 2/2012 | Bodanese et al. | |
| 2012/0093587 A1 | 4/2012 | Finn et al. | |
| 2012/0107052 A1 | 5/2012 | Finn et al. | |
| 2013/0233224 A1 | 9/2013 | Bodanese et al. | |
| 2018/0282134 A1* | 10/2018 | Lagerweij | B66C 23/207 |
| 2019/0338757 A1* | 11/2019 | Helmens | B66C 23/185 |

FOREIGN PATENT DOCUMENTS

| | | | |
|---|---|---|---|
| CN | 114341490 A | * | 4/2022 |
| EP | 3722196 A1 | * | 10/2020 |
| KR | 101411472 B1 | * | 6/2014 |
| KR | 101667042 B1 | * | 10/2016 |
| KR | 20210010997 A | * | 1/2021 |

OTHER PUBLICATIONS

J. Hogan, Technip Offshore, Inc.; Red Hawk Cell Spar Hull Fabrication, OTC 17333, 2005 Offshore Technology Conference, Houston, Texas, United States of America.

Search report an Written Opinion issued in Int'l App. serial No. PCT/US2022/038015 dated Nov. 4, 2022, 9 pages.

* cited by examiner

DELIVERY OF A HIGH VOLUME OF FLOATING SYSTEMS FOR WIND TURBINES

CROSS-REFERENCE TO RELATED APPLICATIONS

This application claims the benefit of priority to U.S. provisional application Ser. No. 63/149,607 filed on Feb. 15, 2021, and to U.S. provisional application Ser. No. 63/224,463 filed on Jul. 22, 2021. The priority applications are incorporated herein by reference for all and any purposes.

BACKGROUND

The industry has significant experience in shallow water wind using mono-piles and fixed jackets for foundations but little experience with large-scale floating wind platforms, which may be necessary for the commercialization of off-shore wind resources that slope away from the shore rapidly. The crossover point for the economics of floating versus fixed depends on how cost-effective the floating wind can be made.

Shallow water wind has been through significant efforts to industrialize the delivery process, which is also necessary for the floating wind.

SUMMARY

In some aspects, the disclosure describes a method of constructing a self-erecting lift structure capable of assembling an off-shore wind turbine system. The method may comprise the step of providing a platform positioned above sea level and secured to the seafloor at a first off-shore location. The method may comprise the step of providing an installation base on the seafloor adjacent to the first off-shore location, wherein the installation base is configured to be releasably connected to a floating vessel of the off-shore wind turbine system. The method may comprise the step of providing the self-erecting lift structure positioned on the platform. The self-erecting lift structure may include an elevator tower, a traveling cradle beam, and a crane. The elevator tower may include a stack of tower modules. Each of the tower modules may include a guide portion. The guide portion of each of the tower modules may be aligned with a guide portion of another tower module. The traveling cradle beam may be coupled to at least one guide portion of the elevator tower. The crane may be supported by the traveling cradle beam.

In other aspects, the disclosure describes a method of assembling an off-shore wind turbine system. The method may comprise the step of towing a floating vessel of the off-shore wind turbine system. The method may comprise the step of securing the floating vessel to a platform located at the first off-shore location. The method may comprise the step of lowering the floating vessel so that the floating vessel connects to an installation base provided on the seafloor adjacent to the first off-shore location. The method may comprise the step of mounting a nacelle and blades on the floating vessel while the floating vessel is secured to the platform. The method may comprise the step of disconnecting the floating vessel from the installation base after the nacelle and the blades are mounted on the floating vessel to raise the floating vessel, the nacelle, and the blades.

In yet other aspects, the disclosure describes another method of assembling an off-shore wind turbine system. The method may comprise the step of constructing a floating vessel by welding together a plurality of sections. Each of the sections may include a cylindrical plate and a stiffening ring welded inside the cylindrical plate. Each of the sections may include two or more bulkheads. The method may comprise the step of towing the floating vessel on a barge to a first location. The method may comprise the step of submerging the barge so that the floating vessel floats horizontally on the sea surface. The method may comprise the step of towing the floating vessel to a platform located off-shore. The method may comprise the step of mounting a nacelle and blades on the floating vessel while the floating vessel is secured to the platform. The method may comprise the step of towing the floating vessel, the nacelle, and the blades vertically to a second off-shore location different from the first location.

BRIEF DESCRIPTION OF THE DRAWINGS

For a more detailed description of the embodiments of the disclosure, reference will now be made to the accompanying drawings, wherein.

DETAILED DESCRIPTION

Figure 1:
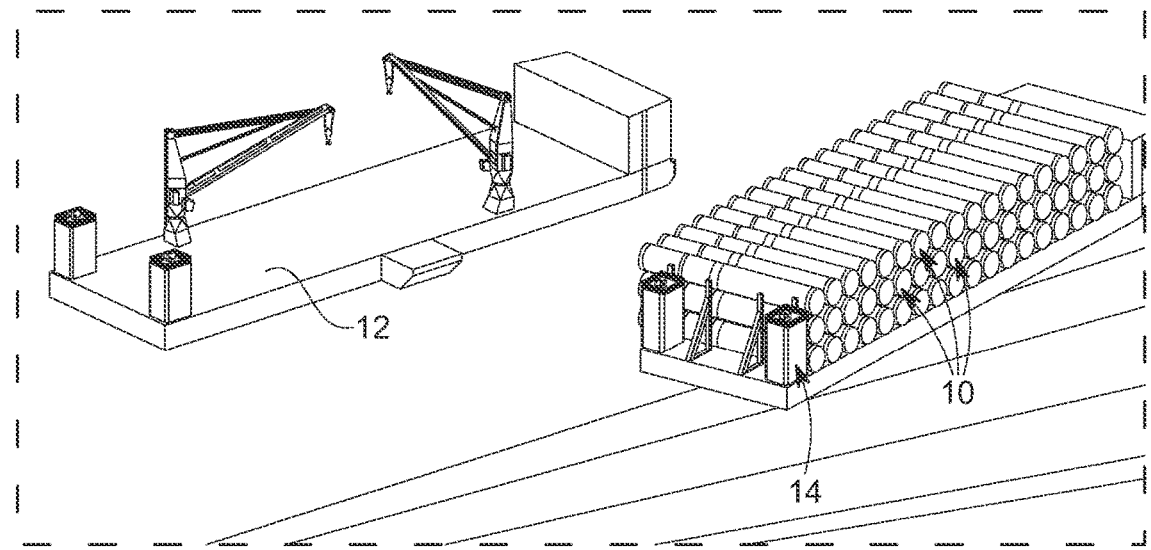
FIGS. 1 to 7 illustrate a sequence of steps for assembling an off-shore wind turbine system.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

Deep-water floating systems for oil and gas could be the template for the concepts that are being developed for floating wind, but there can be a large difference between the scale that will be required. A single large floating system for oil and gas can achieve economic throughput of several million dollars per day, whereas each floating wind system will only generate roughly 15,000 to 20,000 dollars per day. Consequently, the number of platforms required will be much higher for floating wind versus floating systems for oil and gas. In order to achieve the scale required to amortize costs appropriately, floating wind projects are typically targeting 1 GigaWatt or similar capacity, which will require approximately sixty platforms.

Given that deep-water floating systems for oil and gas are typically manufactured over a several-year period of time with significant time/resources expended in design, manufacturing, assembly in a dry dock, transport on heavy-lift ships, and installation using dedicated installation vessels; it is clear that all of these phases can be improved to make repetitive, reduce the labor content and variability. It can therefore be seen that whereas the same concepts and techniques are a good starting point for floating wind, each phase of the process must be significantly more cost-effective. The entire process is industrialized, with the following shortcomings addressed:

Engineering—oil and gas platforms typically are custom engineered for each platform;

Manufacturing—standard shipyard construction uses main steel and stiffening methods;

Assembly—joining sections is manpower intensive and is typically done in a dry dock, which limits the sizes of platforms and is very cost-intensive;

Transport—platforms are typically manufactured in Asia and then transported to either Europe or North America, where they will be deployed. Given the size of the platforms, limited numbers of platforms can be included on a single voyage;

Installation—large crane vessels are required to perform the installation of oil and gas process equipment. Specialized wind installation vessels are available but may have difficult interfaces with floating platforms due to the relative motions.

A high volume delivery system is preferable to be able to make floating wind economic, comprising the following components:

Standard design of sections, such as "tubes," comprising internal compartmentation (by watertight "decks"), rolled plate, and ring stiffeners. Standard details and standard designs reduce engineering costs. Rolling and welding techniques are more cost-effective than using main steel and stiffening methods;

Transportation in a block of tubes, which can be used to move the pre-assembled tubes to an assembly location that is closer to the planned installation point. The block of tubes can be joined together to be able to float off a heavy lift ship, thereby allowing the transportation vessel to transport enough tubes to make approximately 10-15 floating systems in a single voyage. An assembly site that consists of a submersible barge with several large cranes onboard. The floating systems can then be assembled on the barge, which can then be submerged to float off. Because this assembly site can then be located close to where the installation can be done, it can both minimize the transportation costs to site and can also allow local workforces to perform the final assembly.

Examples of Configurations

The same components and delivery method can be used to manufacture any of the following structures:

Semi-submersible—the columns and pontoons can all be made using the same tubular construction, with the pontoons coped to match the columns. A significant advantage of this design is that the wind platforms are driven by the overturning moment applied by the turbine in the most severe operating conditions. This moment can be accommodated by making the spacing of the columns much larger than can be accomplished in any but the largest dry docks, while being accessible to site.

Buoyant Tower—the tubes can be joined together to form a spar-like platform (center of gravity below the center of buoyancy) that is bottom founded but uses a base to resist lateral and yaw-rotational moment. This base can be a steel suction can or piled template with an elastomeric element on top to be able to provide resistance but with the flexibility to prevent overload. This structure can have the nacelle installed at a dedicated location (deeper than planned deployment location) and then be towed vertically to site.

Spar—similar in configuration to the buoyant Tower, but the total draft does not have to be the same as the depth of the planned deployment location and will have mooring lines that hold the platform in place. The anchors can be any of the standard types. The nacelle will be installed in a similar fashion to that noted above for the buoyant Tower.

The nacelle and blades can be installed using the barge cranes if the floating system is in the shape of a semi-submersible.

If the floating system is either a spar or buoyant Tower, the nacelle and blades can be installed using a platform, such as either a standard jack-up installation vessel or a purpose-built crane jacket.

FIG. 1 illustrates a plurality of sections that can be coupled together to form a floating vessel. For example, the sections comprise the tubes 10 previously described. The tubes are transported to a location, in this example inshore, on a first barge 14. As used herein and in the appended claims, inshore generally means in protected waters, such as in a port at a quayside, or within several (i.e., less than ten) miles of the shoreline. At this location, a second barge, which includes cranes, is provided.

Figure 2:
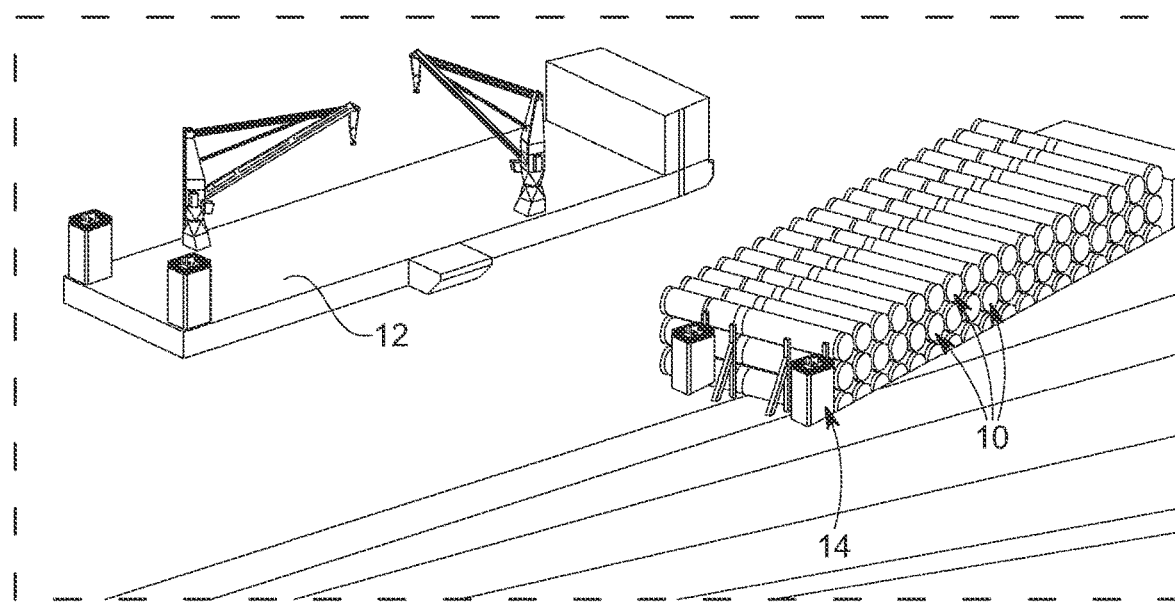

FIG. 2 illustrates that the first barge 14 can be submerged to unload the tubes 10 and reload them on the second barge 12, where they can be assembled into a floating vessel. Thus, constructing the floating vessel can be performed at least partially on a submersible barge 12 located inshore. Alternatively, constructing the floating vessel could be performed at least partially onshore in a shipyard, port, or at a quayside.

Figure 3A:
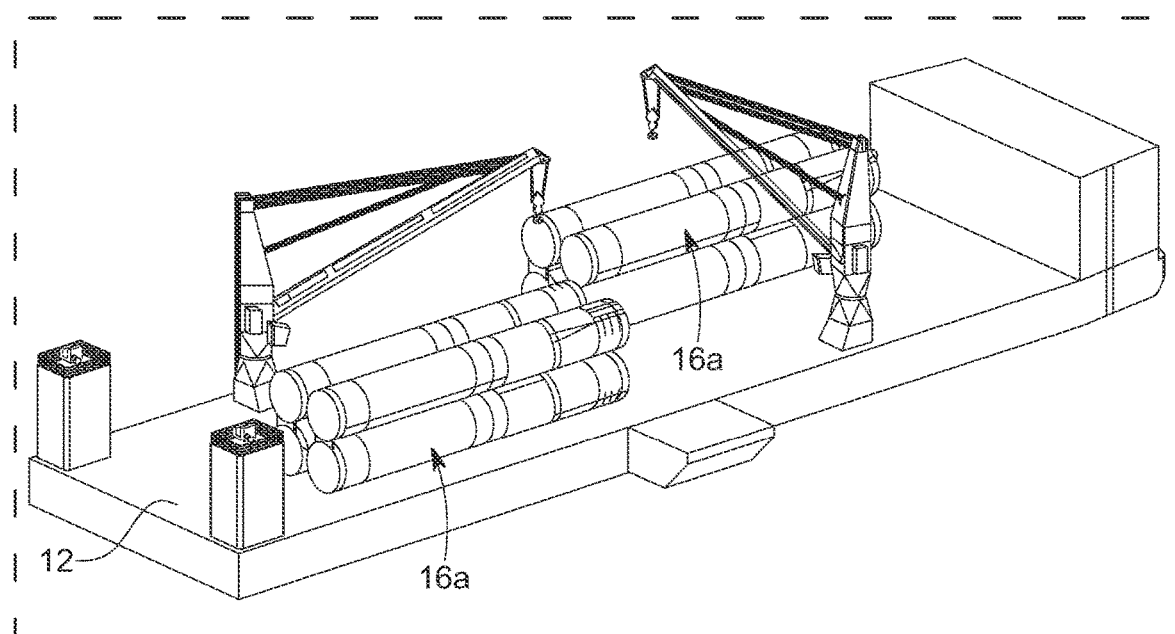
Figure 4A:
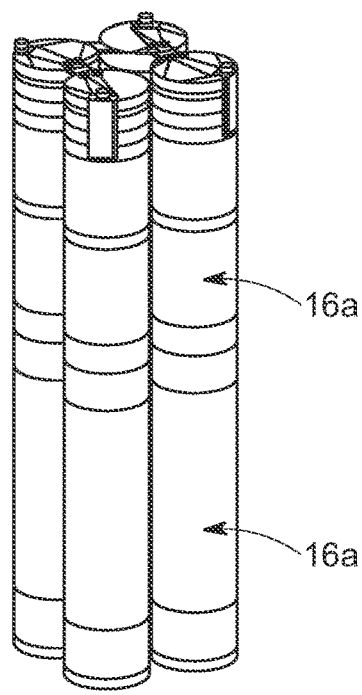

FIGS. 3A and 4A illustrate the construction of a floating vessel in accordance with an example. In this example, the floating vessel is a buoyant tower 16a.

Figure 3B:
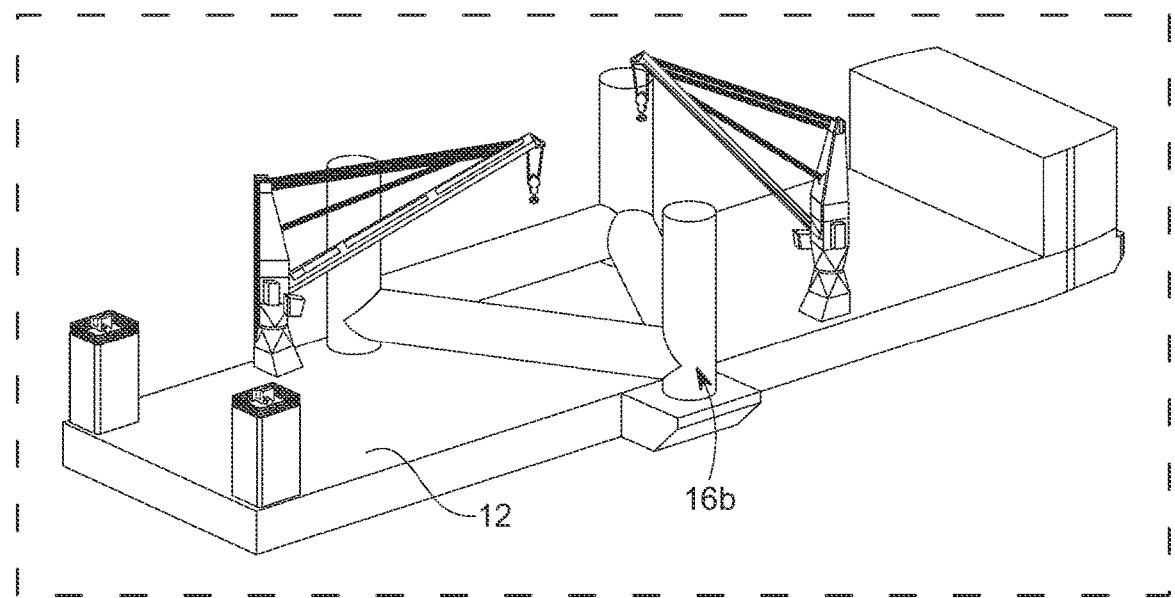
Figure 4B:
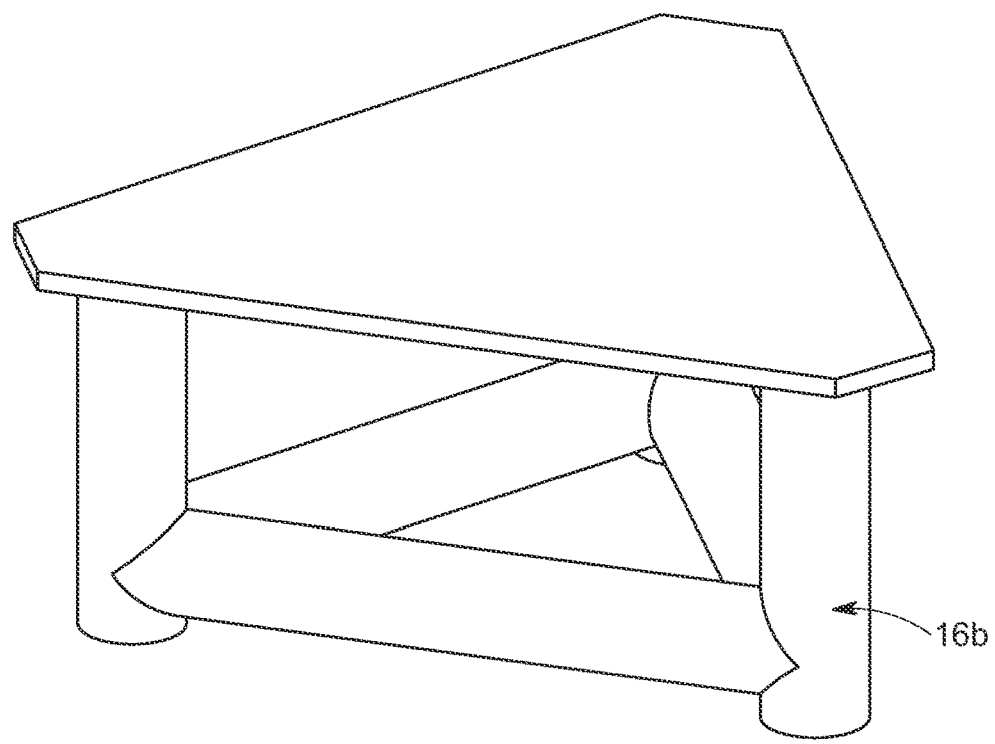

FIGS. 3B and 4B illustrate the construction of a floating vessel in accordance with another example. In this example, the floating vessel is a floating semi-submersible 16b.

As mentioned previously, another example of floating vessel is a spar.

Once constructed, the floating vessel can be transported by a third barge in the vicinity of a platform 18 (shown in FIG. 6) that is located off-shore, where the third barge is submerged so that the floating vessel floats horizontally on the sea surface. If the floating vessel is a spar or a buoyant tower, the floating vessel is upended.

Figure 5:
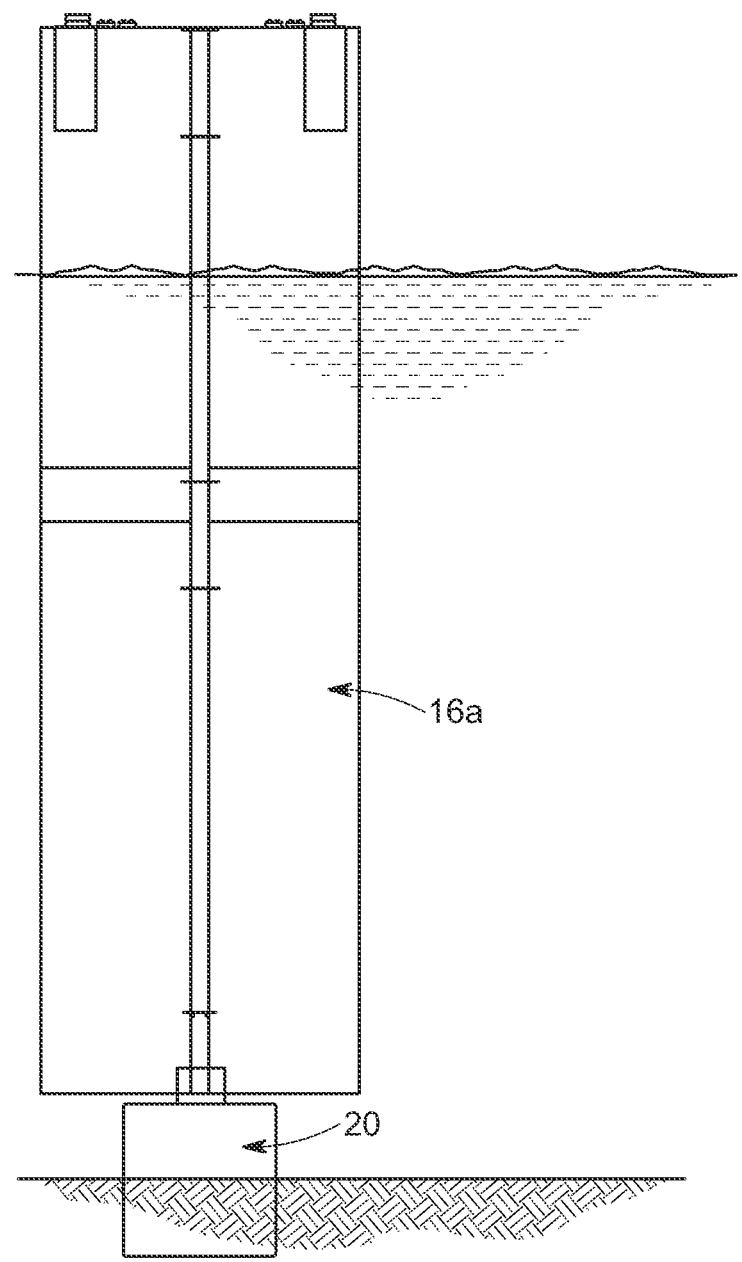
Figure 6:
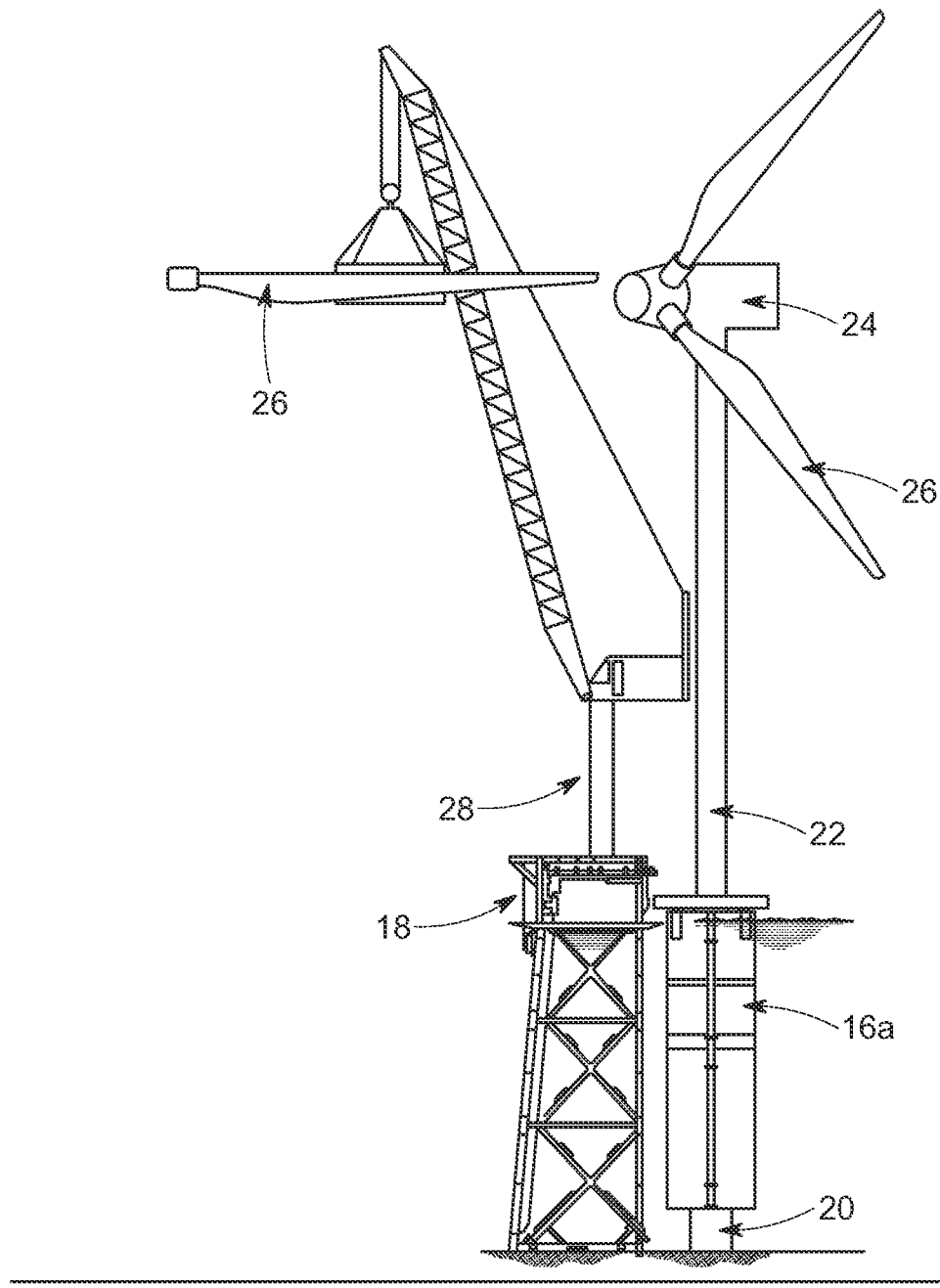

In FIG. 5, the floating vessel (e.g., the buoyant tower 16a) is releasably connected to an installation base 20, which is located next to the platform 18 and secured to the platform 18 (shown in FIG. 6).

In FIG. 6, a lift structure 28 on the platform 18 is used to mount a Tower 22, a nacelle 24, and blades 26 on the floating vessel (e.g., the buoyant tower 16a). The Tower 22, nacelle 24, and blades 26 are transported to the platform 18 on barges. Then the floating vessel is disconnected from the installation base 20, and the floating vessel (e.g., the buoyant tower 16a) with the Tower 22, nacelle 24, and blades 26 mounted thereon are towed vertically to a location where the off-shore wind turbine system is intended to be used.

Figure 7:
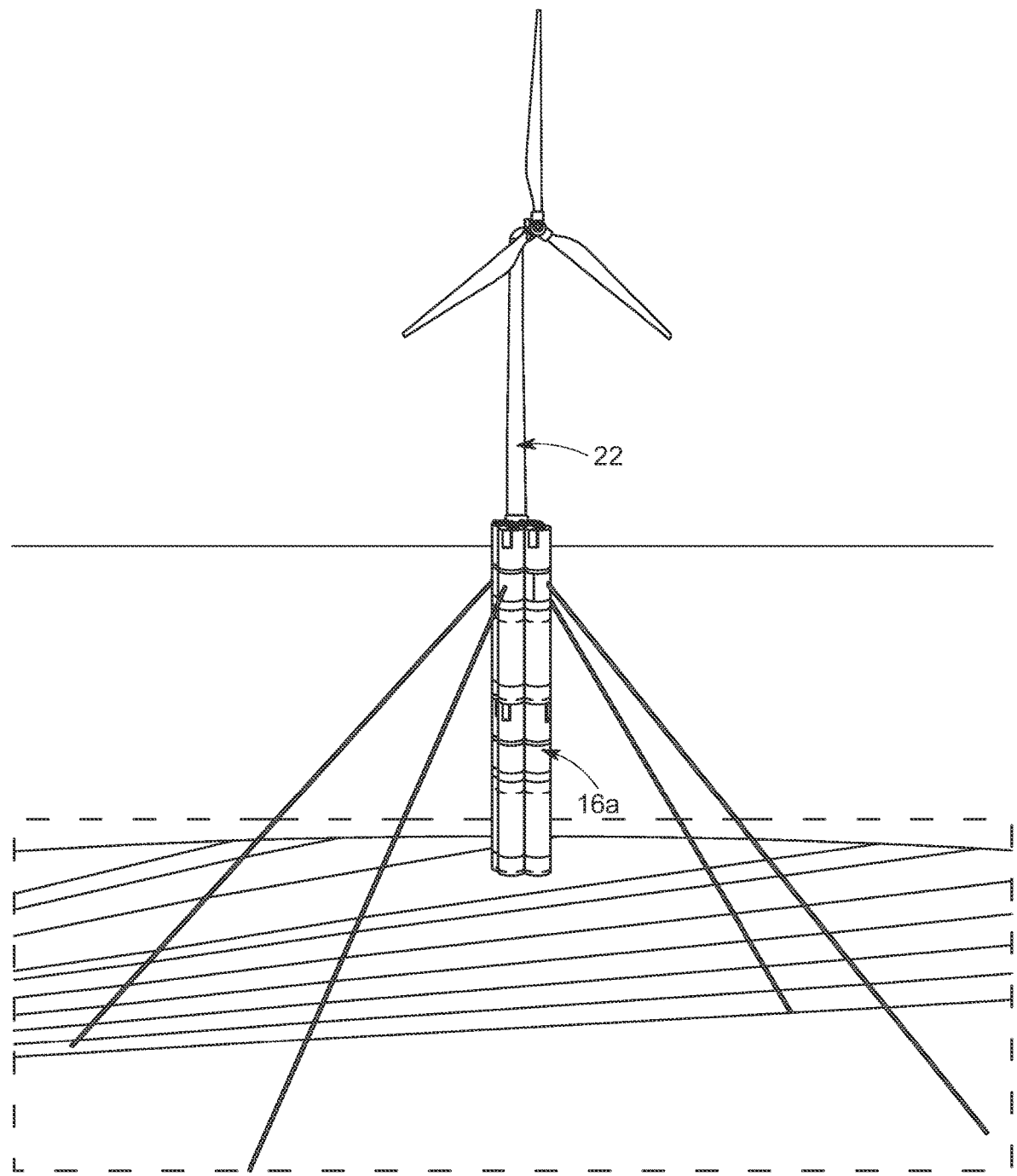

FIG. 7 illustrates an example of the floating vessel (e.g., the buoyant tower 16a) with the Tower 22, nacelle 24, and blades 26 mounted thereon, in use. In use, the floating vessel may or may not be attached to a pile driven into the seafloor, and may or may not be moored.

Some floating off-shore wind support structures allow port-side assembly using quay cranes in contrast to bottom fixed turbines. The elimination of the off-shore wind turbine installation has a large cost advantage and also extends the suitable weather windows for the installation operation.

For the spar concept, a large water depth is required in order to install the Tower, nacelle, and blades. Only a small number of locations globally have suitable conditions. Alternatively, the turbine can be installed off-shore in deeper water. However, the need to use a floating lifting crane is even more expensive than a jack-up vessel as used for bottom fixed turbines in shallower water depth. In addition, suitable installation windows are limited due to the benign met-ocean conditions required for such a vessel to operate in. The lift between two floating bodies is challenging, has higher risk, and can only be performed during certain environmental conditions limiting the installation windows.

The simpler manufacturing process and the easier serial production provide sufficient reason not to give up on the spar concept and rather develop innovative, safe, robust, and cost-efficient installation options off-shore as is disclosed herein.

Note that various concepts for deep-water floating systems are all minor modifications of the basic spar concept, such as the tension Buoyant Tower and the bottom-fixed Buoyant Tower, as well as the moored Buoyant Tower. All of these variants can be addressed using the methods that are described herein.

Delivery systems for wind platforms are quite different from methods that are commonly used for oil production floating systems because 1) the revenue associated with a single platform is an order of magnitude less and therefore demands a more cost-effective structure and 2) a large number of platforms are required for any given wind farm. Both of these lead to a requirement to industrialize and serialize the process.

Simplified Framing and Manufacturing Methods

Using the approaches that were pioneered by the Cell Spar and the Buoyant Tower, the framing of a floating system can be made to be much more repetitive and simpler than in a traditional floating system. The product variety is therefore reduced for the most part to Can Rolling, Ring T-Beam manufacture, and Bulkhead deck flat manufacture. This simpler framing, in combination with the modern trend of shipyard automation with offline programmed robotic welding allows the rapid industrialized process that can be used to produce these structures in bulk very rapidly.

Spars 16c1, 16c2, and 16c3 can be designed in several configurations, including very large diameter single cells or multiple cells that are of smaller diameter. Examples of these configurations are illustrated in FIGS. 9, 9A, 9B, and 9C.

Figure 8:
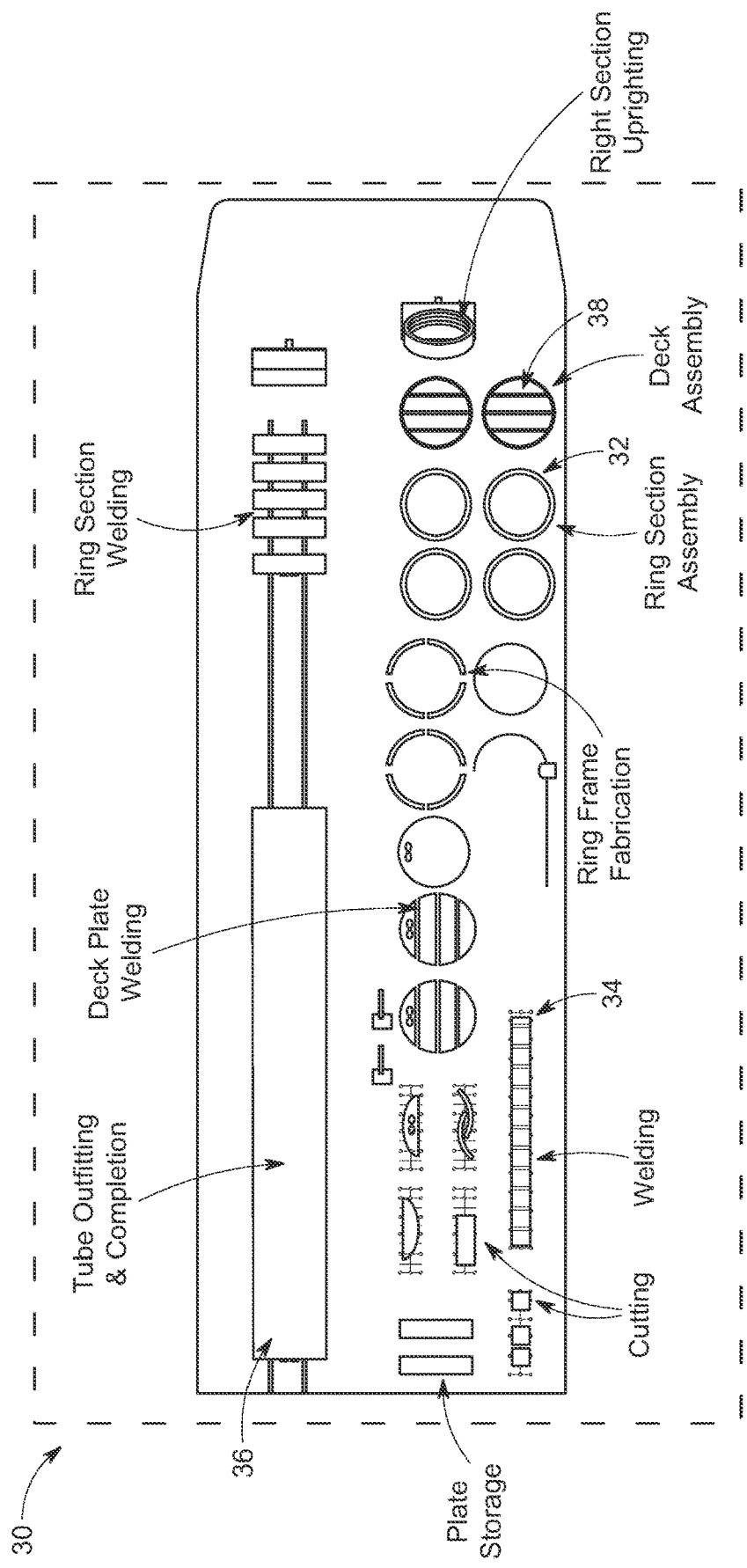
FIGS. 8 to 21 illustrate another sequence of steps for assembling an off-shore wind turbine system.
Figure 9:
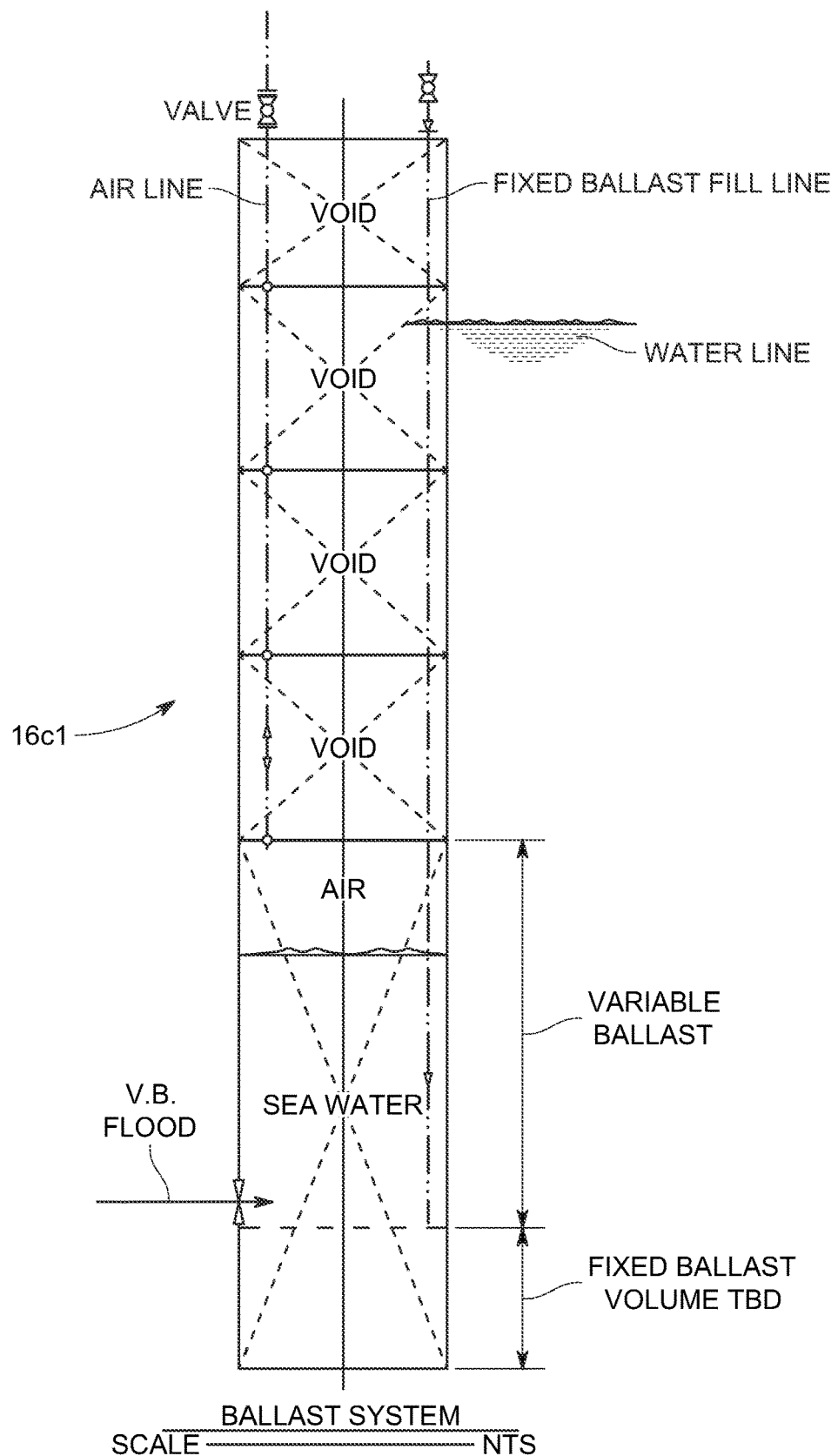
Figures 9A, 9B, 9C:
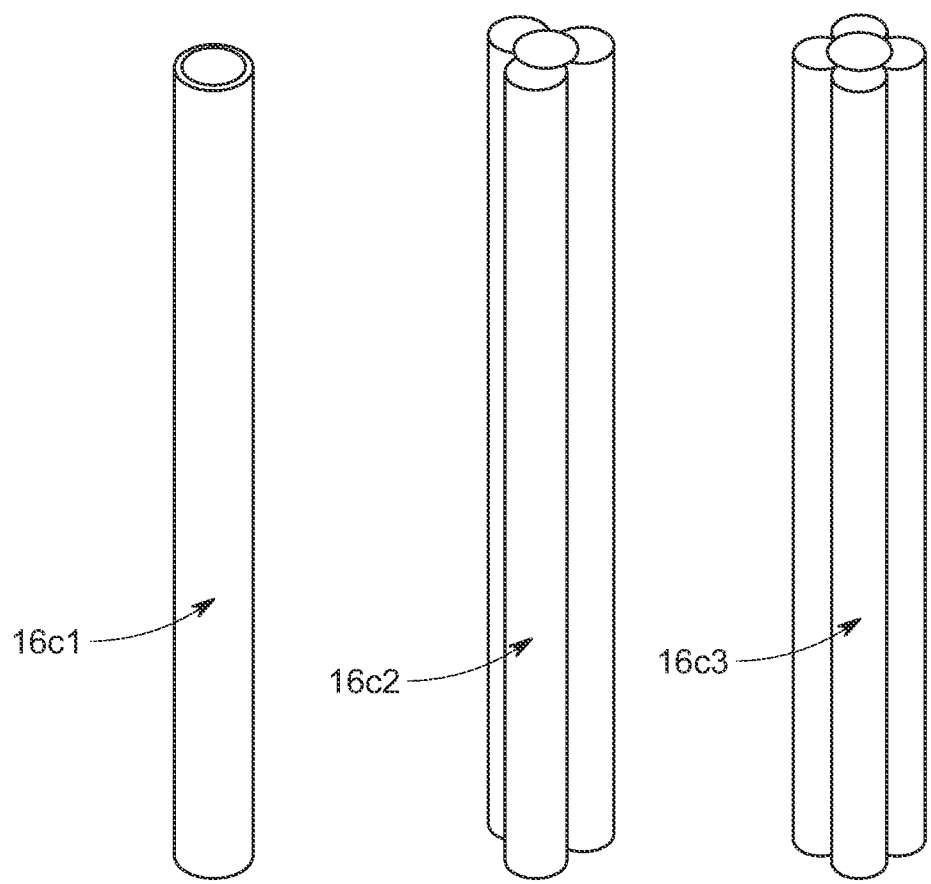

Referring to FIG. 8, sections 32, such as ring stiffened cans, may be made by rolling a flat plate 34 to the proper diameter. The individual ring sections can be manufactured in several methods, including rolling a split beam or by fabricating them. In either case, the outside dimension is important for the overall can manufacture because the sections are difficult to connect to each other if there are differences in the shape. If they are fabricated, keeping the required tolerances is easy, although, for the rolled method, it may be required to subsequently cut the outside diameter.

Single cans 36 of large diameter (e.g., up to and including approximately 40 feet in diameter) can be made with simple ring stiffening when the wall thicknesses are sufficiently large as well as when the T-beams have a sufficiently large section.

The framing of the pressure bulkheads 38 is also important for the full automation of the manufacturing. The bulkhead girder depth is preferably less than 3 meters or 10 feet because this allows the bulkhead deck to be fully self-contained within a single can. If the structure needs to span between two cans, this will require significant manual labor to connect them together in inconvenient orientation.

The manufacturing of the bulkheads 38 can be automated and can comprise multiple main girders (four girders, for example) and can terminate in a single flat bar ring stiffener at the top of the structure.

Using this framing, a facility 30 can be designed that will produce a single vessel in a short amount of time, sufficiently quickly to facilitate serial production that is optimal in overall project cost. An anticipated cycle time for each component of the system can be approximately 3 to 5 days. The flow of the facility is shown in FIG. 8.

This facility 30 can either be built on land as a standard industrial facility, or it can be made compact for the purposes of deploying on a barge 40 which can then be relocated to a location close to the ultimate deployment site. This is important because large-scale transportation from Asia or other locations can be cost-prohibitive if the individual structures are to be cost-effective enough for the economics of wind floating systems.

It is likely that the spar (or similar) structure must be approximately 500 to 600 feet long, which means that some joining operations may be conducted outside of this facility.

Figure 10:
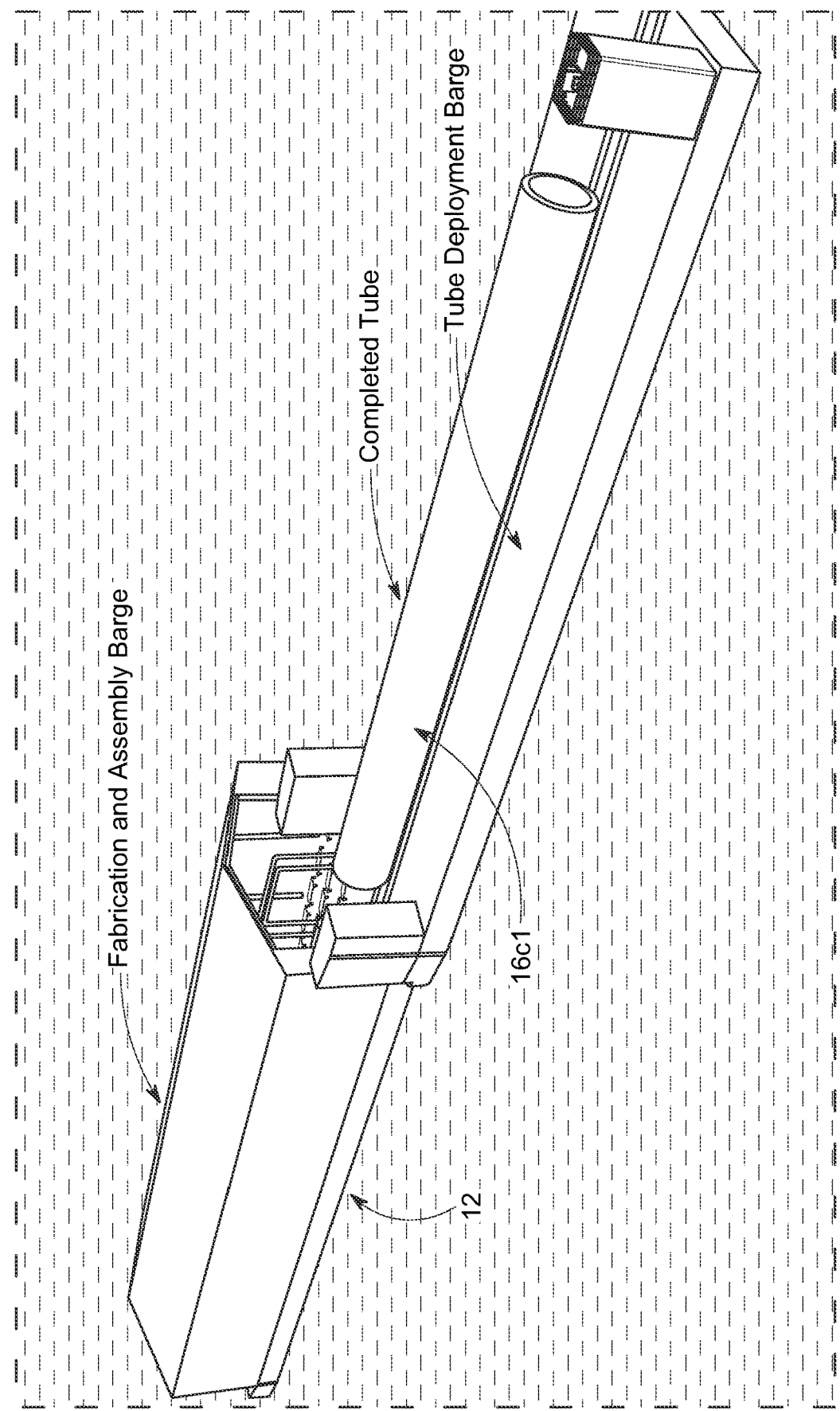

FIG. 10 illustrates that a major portion of the spar hull 16c1 can be skidded out of the production facility (e.g., the facility 30 shown in FIG. 8) in the port to an assembly location where the wind turbine tower can be installed. The major spar sections can be welded together on the barge 12. The wind turbine Tower 22 can also be welded onto an interface on the spar hull 16c1 so that no flanges or grouted connections will be required, which might be points of failure. Alternatively, the Tower can be welded, grouted, flanged, etc., to the spar hull 16c1.

Figure 11:
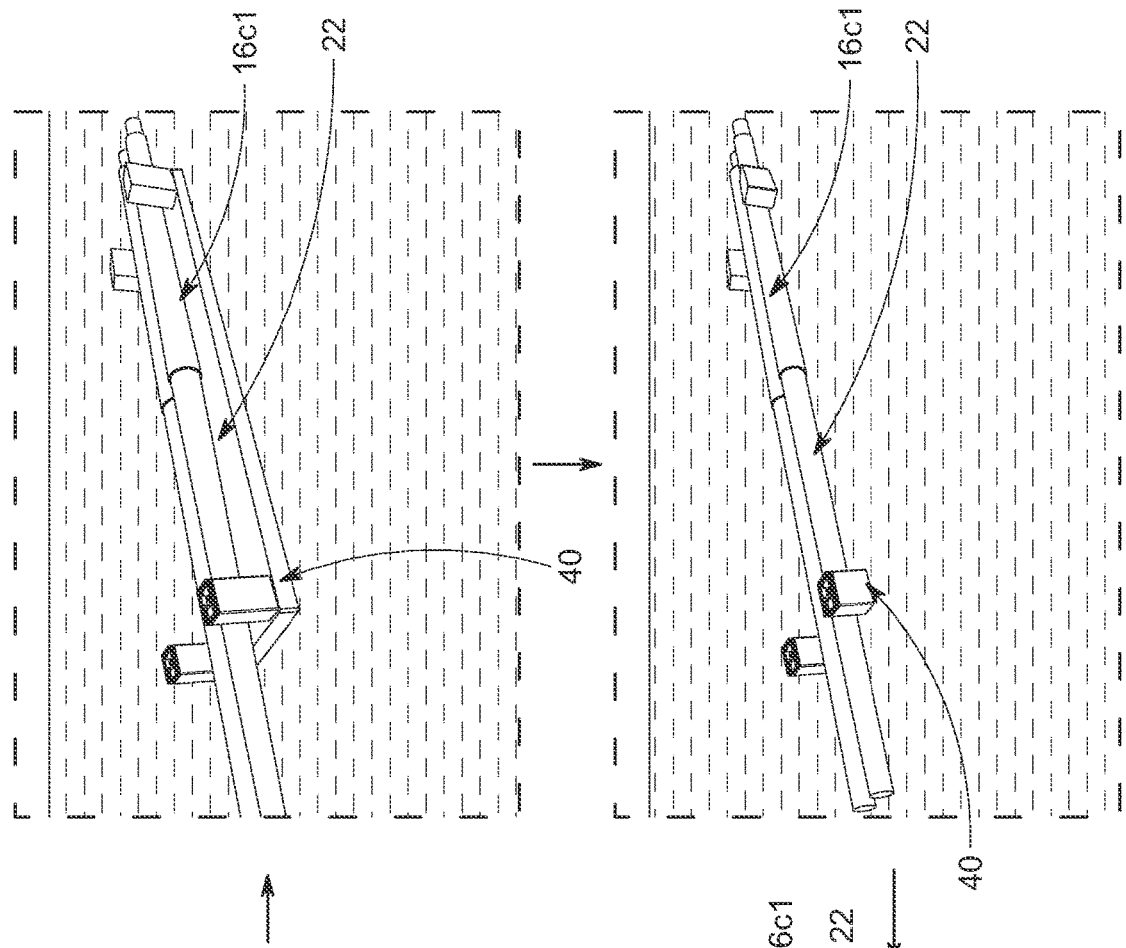
Figure 11:
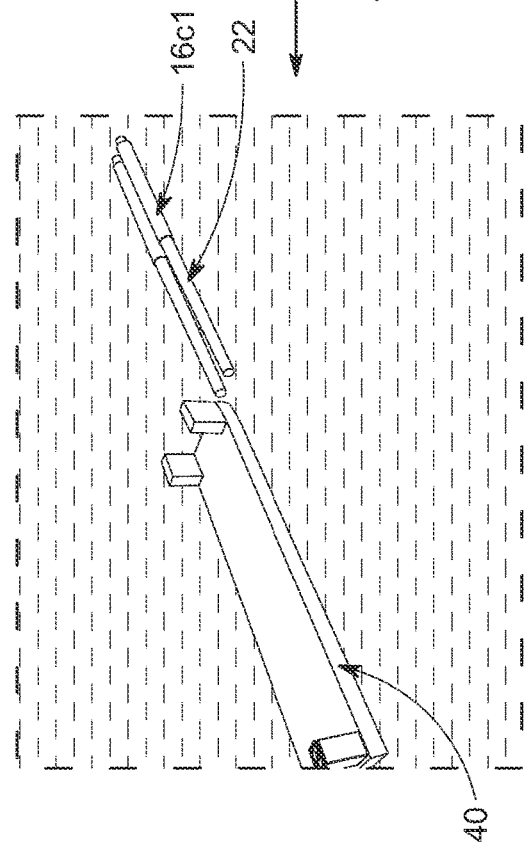

The combined spar hull 16c1 and Tower assembly 22 can then be transferred to a submersible barge 40 and towed out, as is illustrated in FIG. 11.

Figure 12:
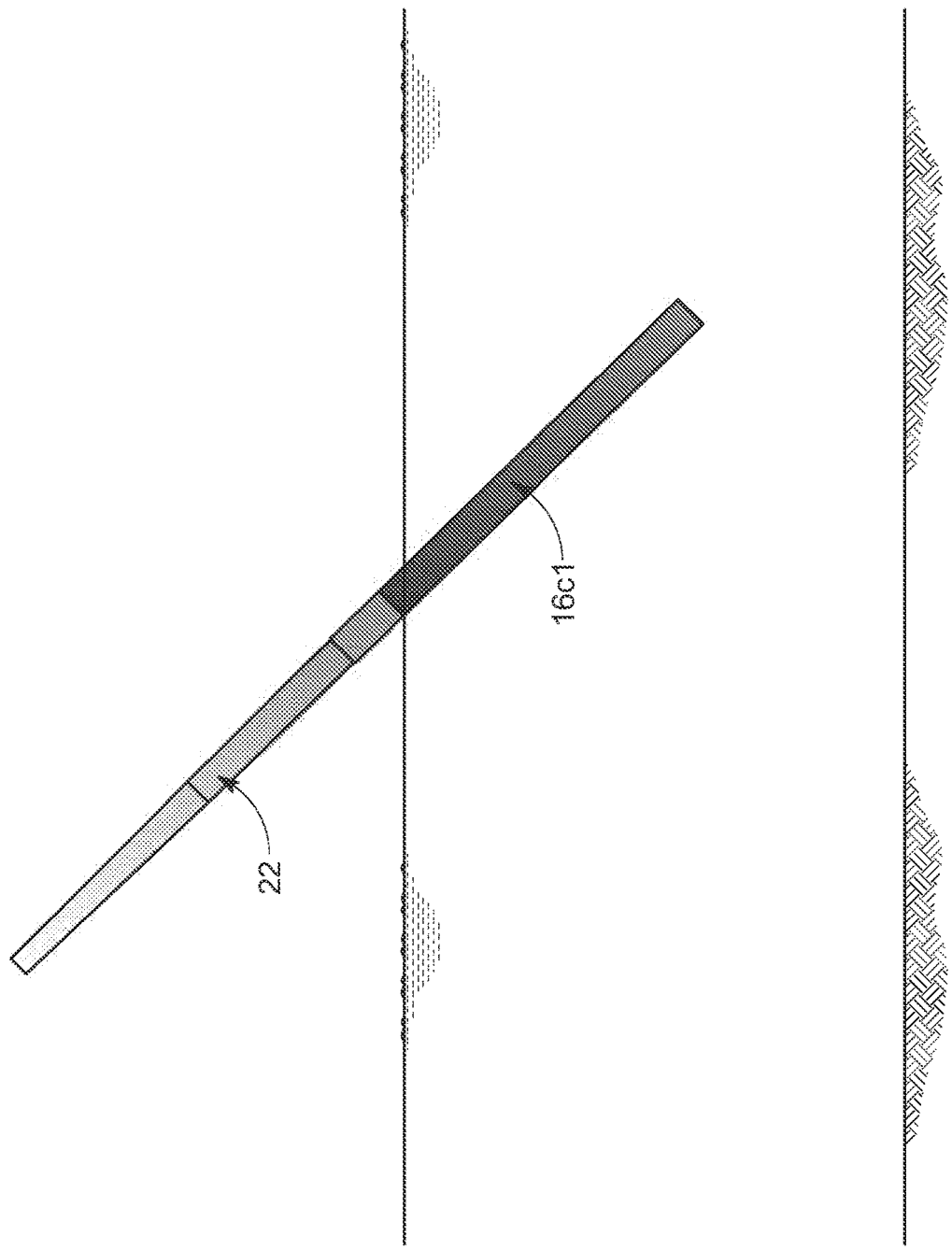

The utilization of a barge can eliminate the requirement of a dry dock. The spar hull 16c1 with Tower 22 will be upended like a conventional spar further off-shore in deeper water closer to the final installation location, as is illustrated in FIG. 12.

Figure 21:
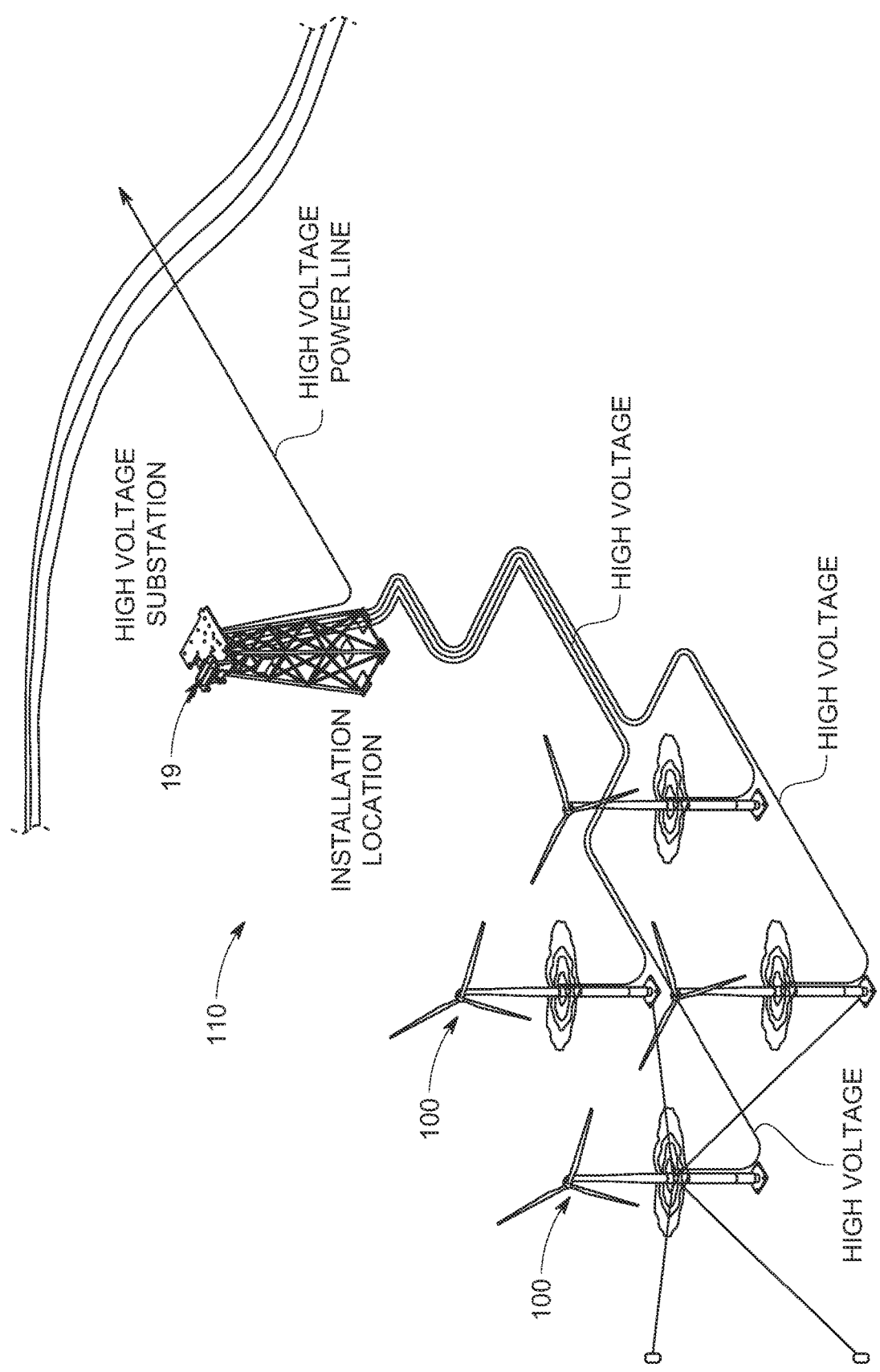

Prior to final installation at the wind farm, the wind turbine's nacelle 24 and rotor blades 26 are installed. In order to avoid expensive floating lifting vessels with limited availability, it is preferred to utilize a platform structure, for example, a deep-water jacket structure 19, near the wind farm. The deep-water jacket structure 19 can optionally be used later on for the transformation substation, wherein the off-shore substation is configured to collect and export the power generated by turbines through submarine cables, as is illustrated in FIG. 21. Of course, it is not always necessary that bottom fixed structures are preferred as transformer substations and also that a transformation is required due to the distance of the wind farm to the mainland.

In the design of the platform structure (e.g., a jacket 19), it is preferable that additional load due to the installation is accounted for, which can add some additional cost, but those costs may be significantly less than a floating crane vessel hire.

Figure 13:
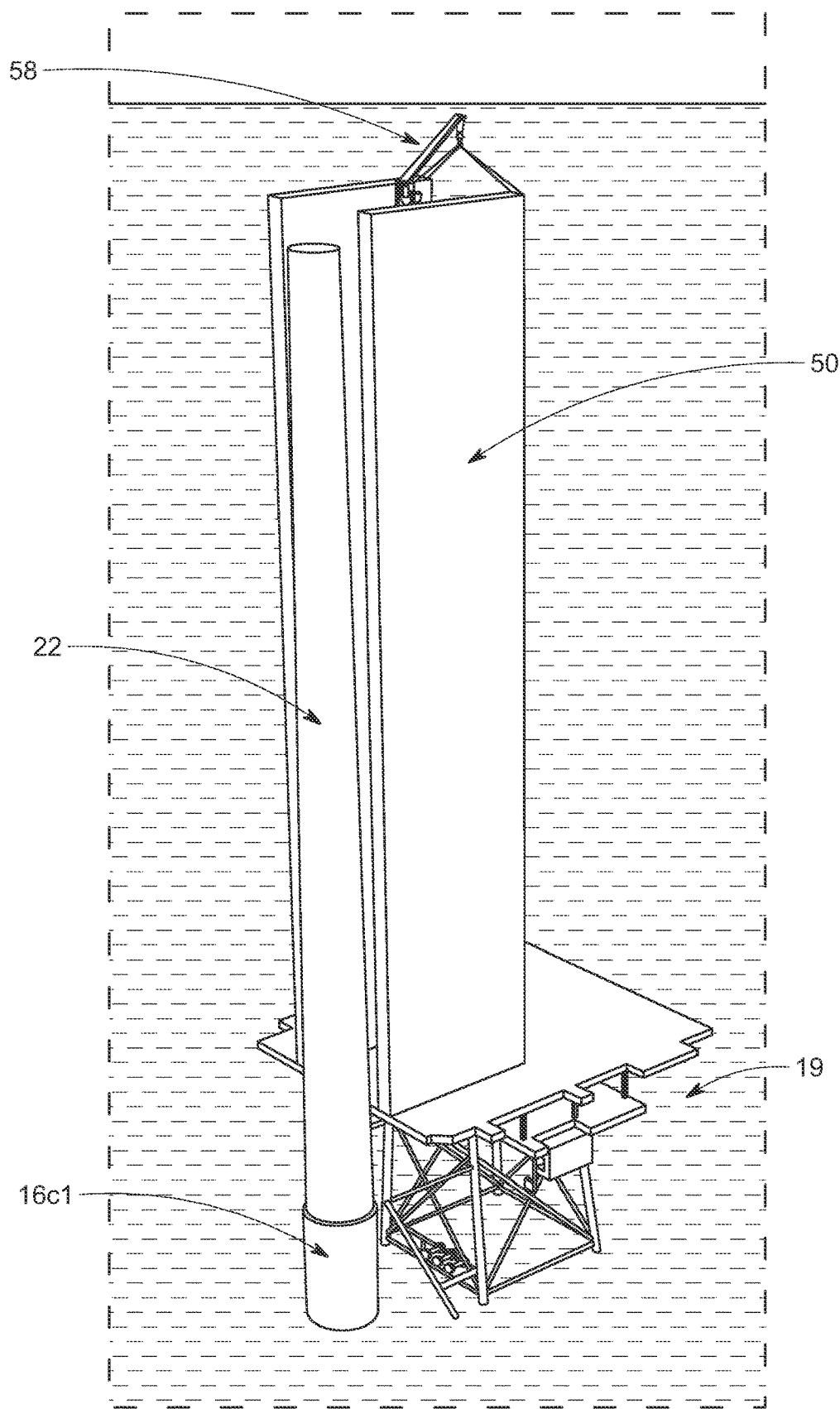
Figure 13A:
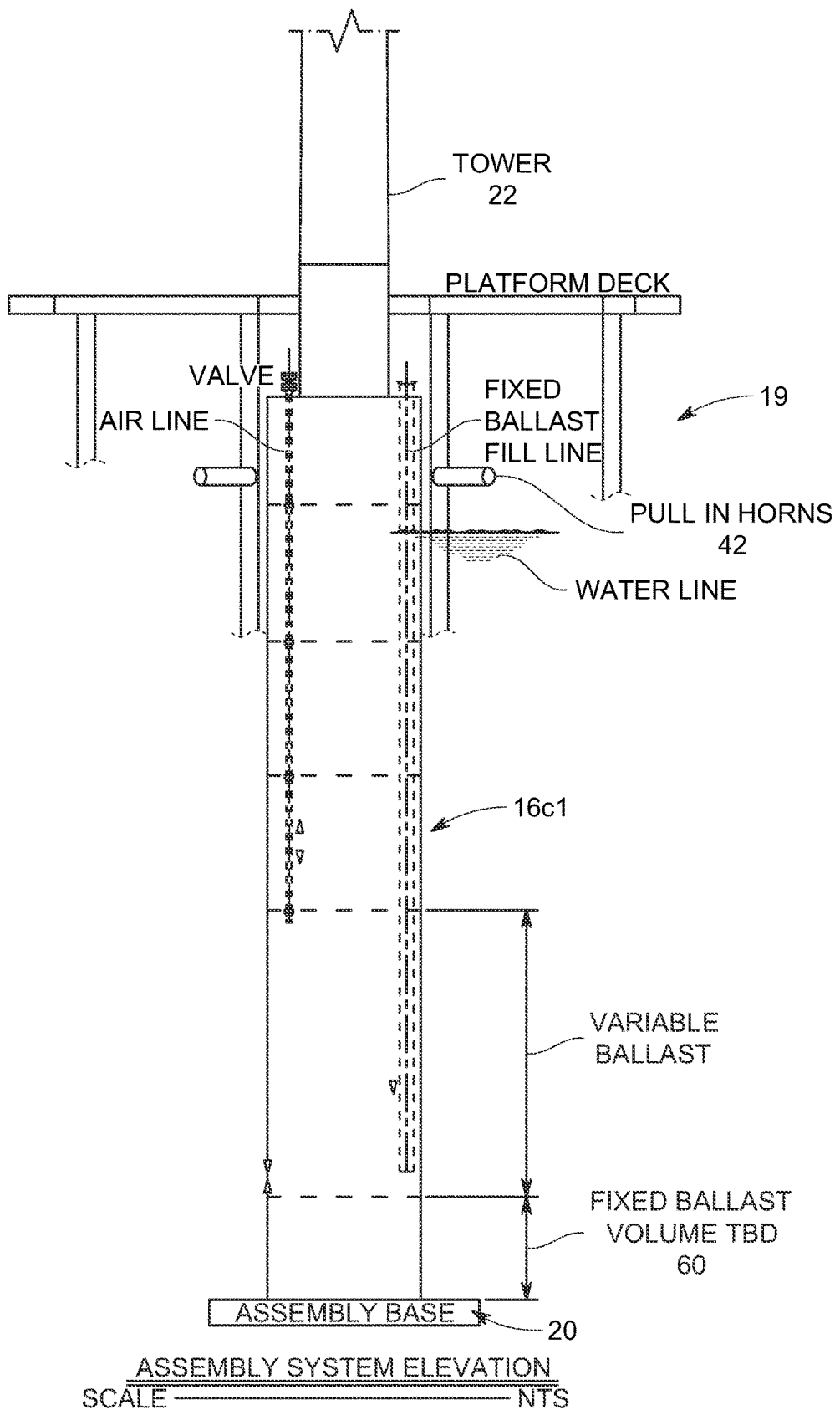
Figure 13B:
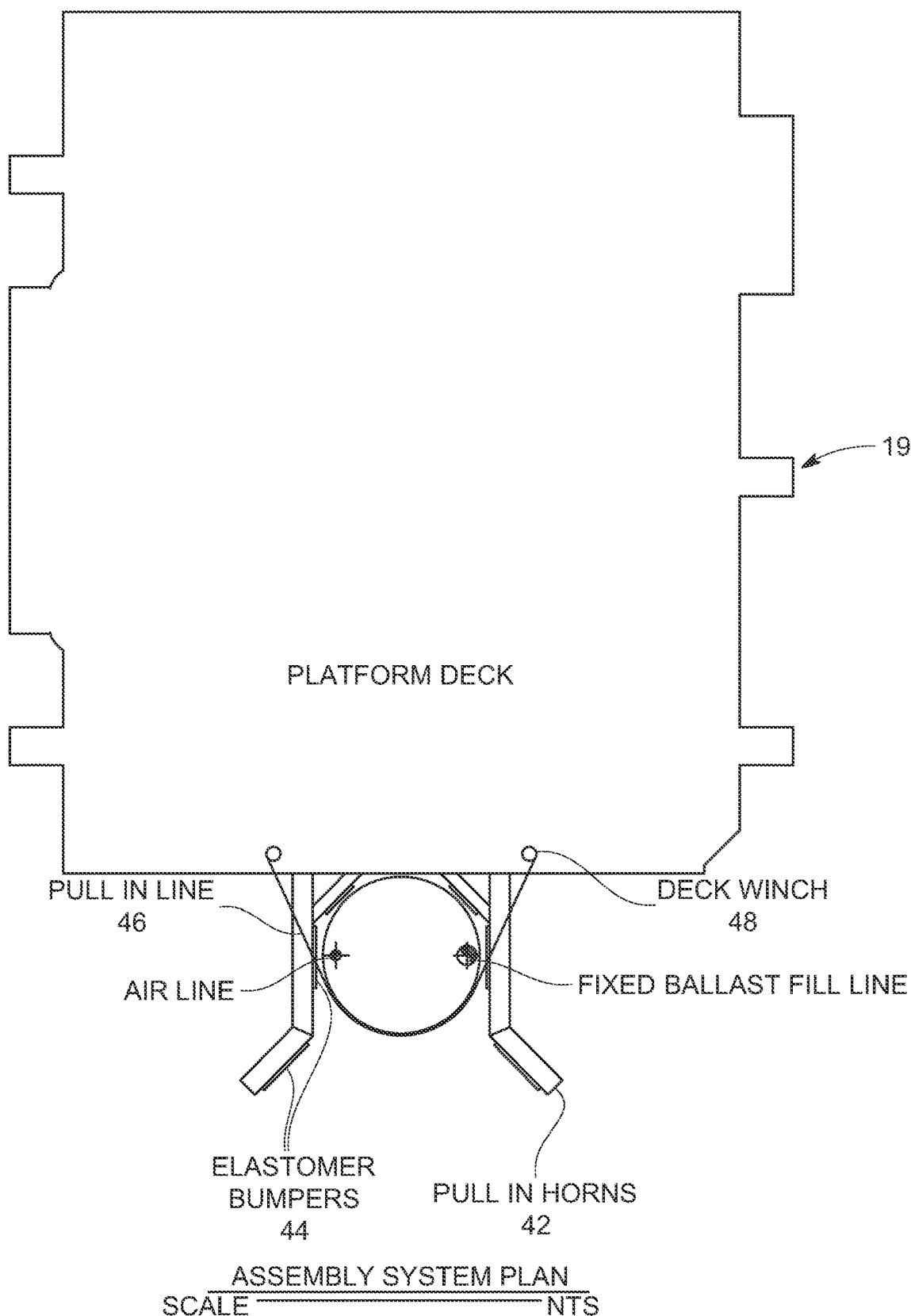

A jacket design 19 is illustrated in FIGS. 13, 13A, and 13B. The jacket 19 includes a fork having two prongs (e.g., pull in horns 42), a bumper 44 located between the two prongs, and a pulling system (e.g., a pulling line 46 and deck winch 48) configured to pull the floating vessel against the bumper. Optionally, the fork having two prongs includes a cowcatcher.

Figure 22:
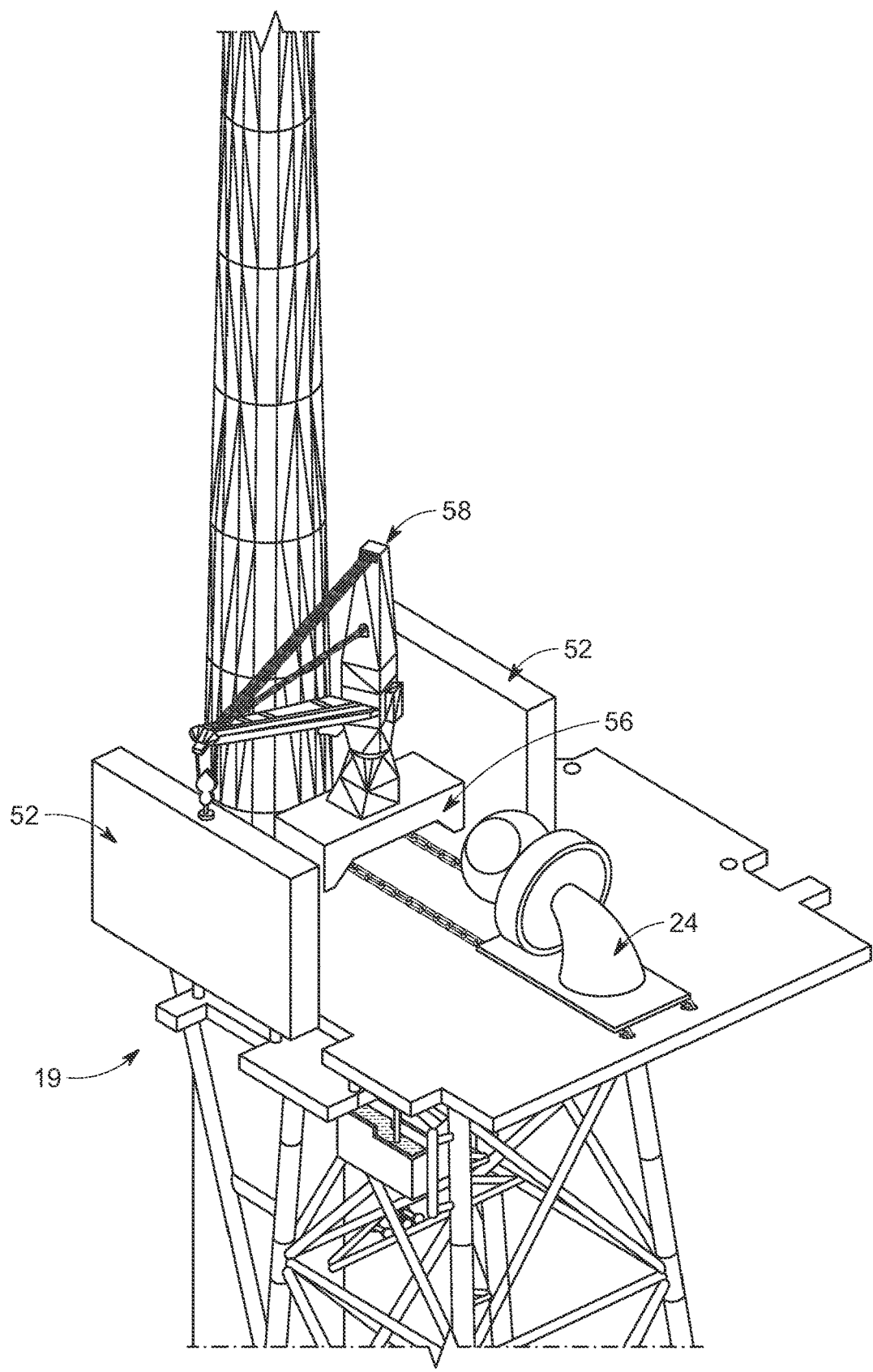
FIGS. 22 to 24 illustrate a sequence of steps for constructing a self-erecting lift structure capable of assembling an off-shore wind turbine system.
Figure 23:
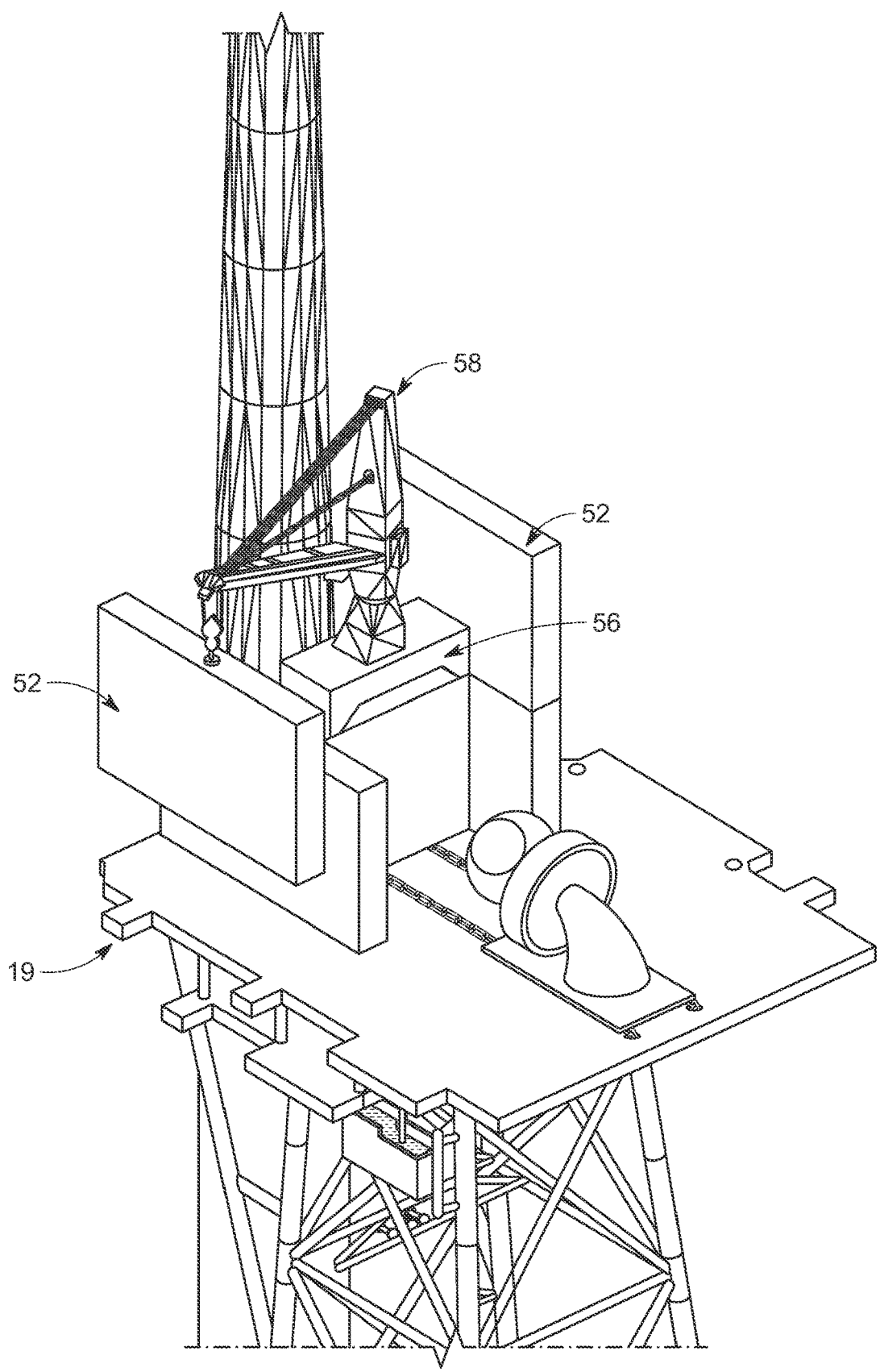
Figure 24:
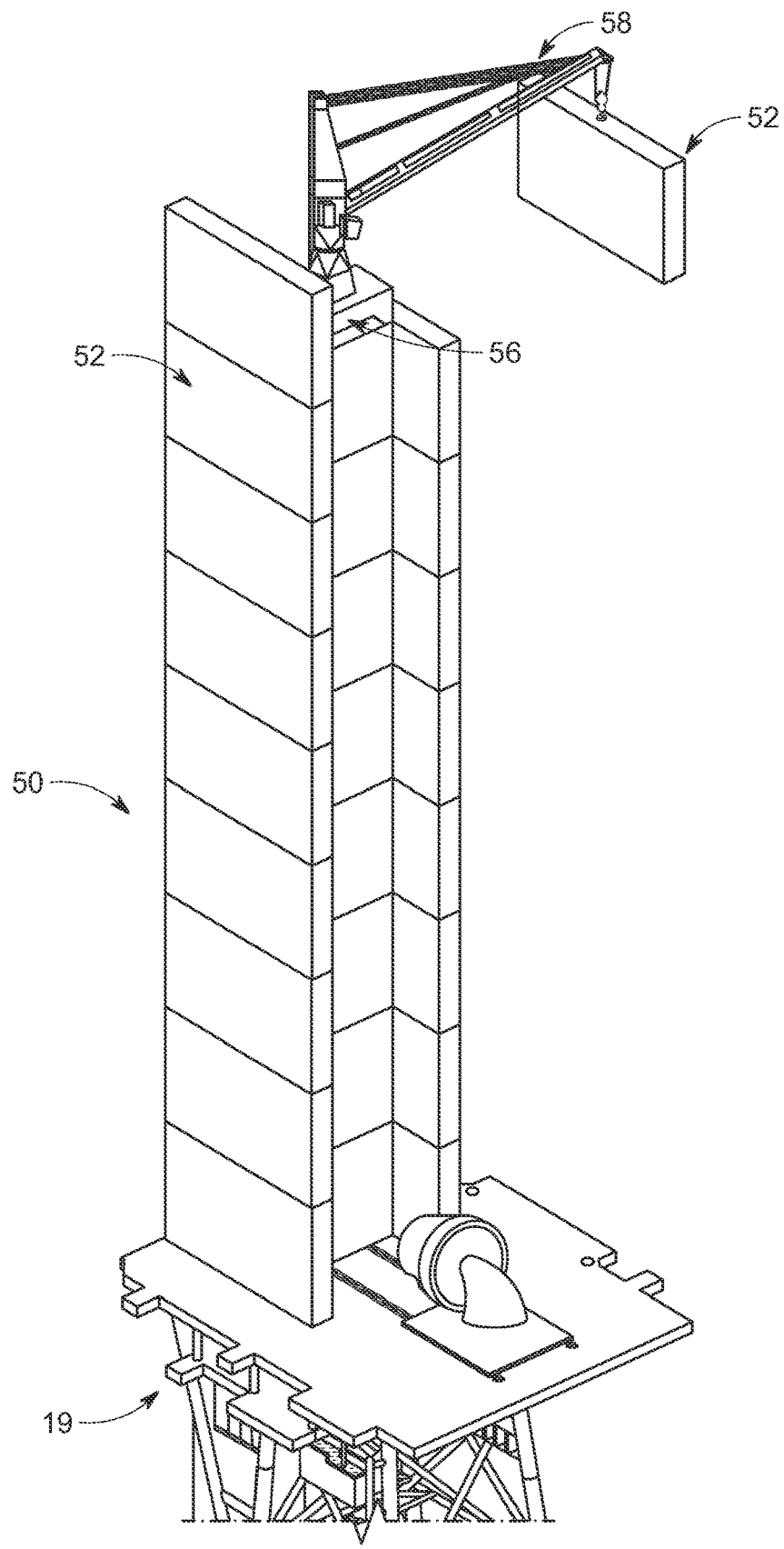

For the lift of the nacelle and rotor blades, a modular, self-erecting lift structure 50 can be used, the construction of which is illustrated in FIGS. 22 to 24. Tower modules 52 are lifted onto a previously constructed stack of tower modules 52 to form an elevator tower. The modular, self-erecting lift structure 50 includes a traveling cradle beam 56 coupled to the guide portions of the elevator tower. A crane 58 is supported by a traveling cradle beam 56. The crane 58 is elevated by raising the traveling cradle beam 56 along the aligned guide portions of the tower modules 52, and optionally retained with a ratcheting mechanism.

The modular, self-erecting lift structure 50 may not be a permanent installation and can be disassembled relocated to a new project side. Alternatively, the modular, self-erecting lift structure 50 may remain in place for repair and maintenance of the wind farm.

Before the rotor installation, fixed ballast 60 will be added to the spar hull 16c1, as is shown in FIG. 13A. The spar's stability principle is that the center of gravity is below the center of buoyancy. Since the nacelle is usually heavy and high above the waterline, the overall center of gravity is preferably lowered by adding significant fixed ballast. This fixed ballast 60 is difficult to install prior to tow-out and upending because the spar would not float horizontally and would have very large bending moments during upending. If the fixed ballast 60 is installed in the vertical orientation, the floatation is very easy, and the upending loads are very low.

Figure 14:
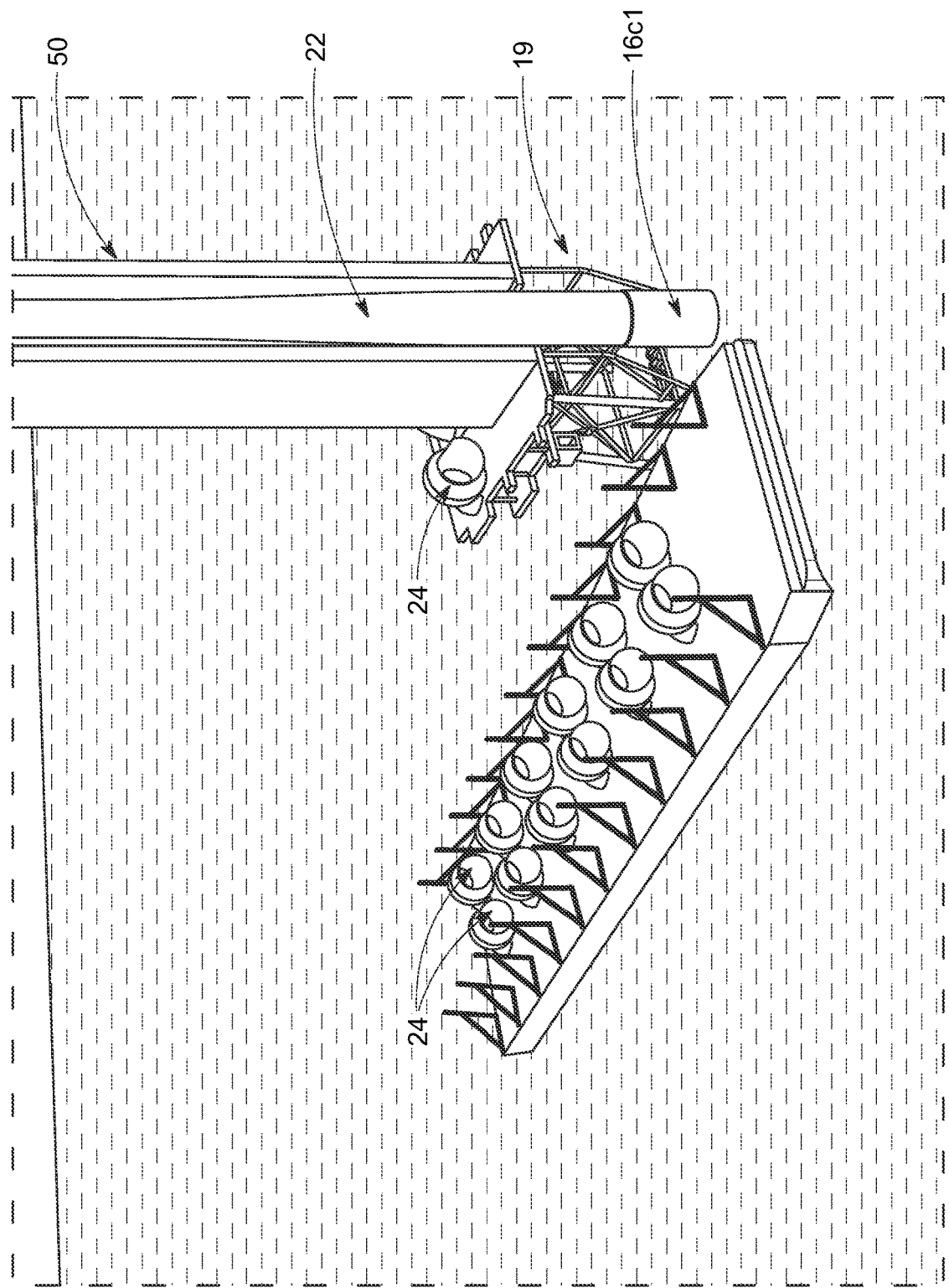
Figure 15:
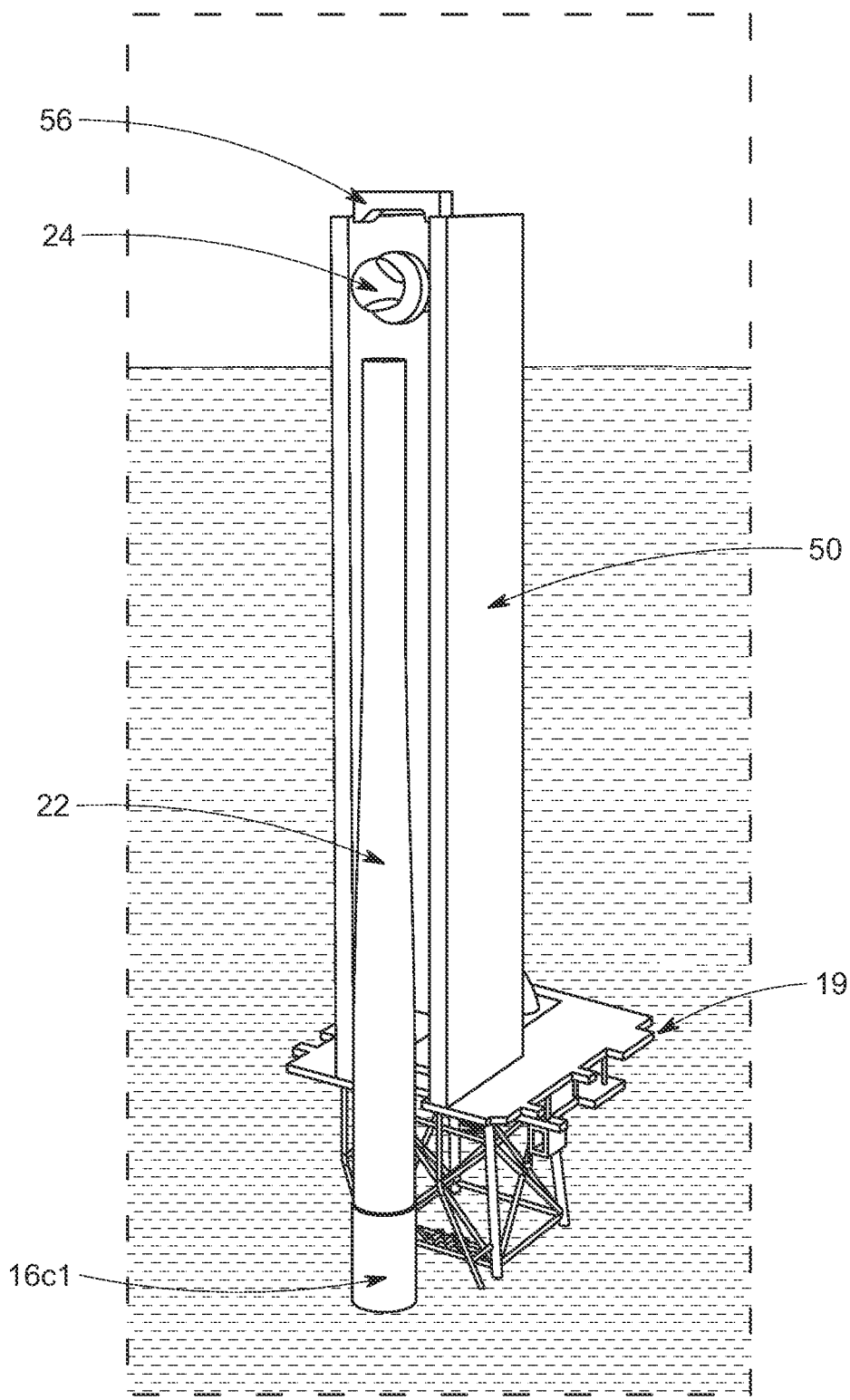
Figure 16:
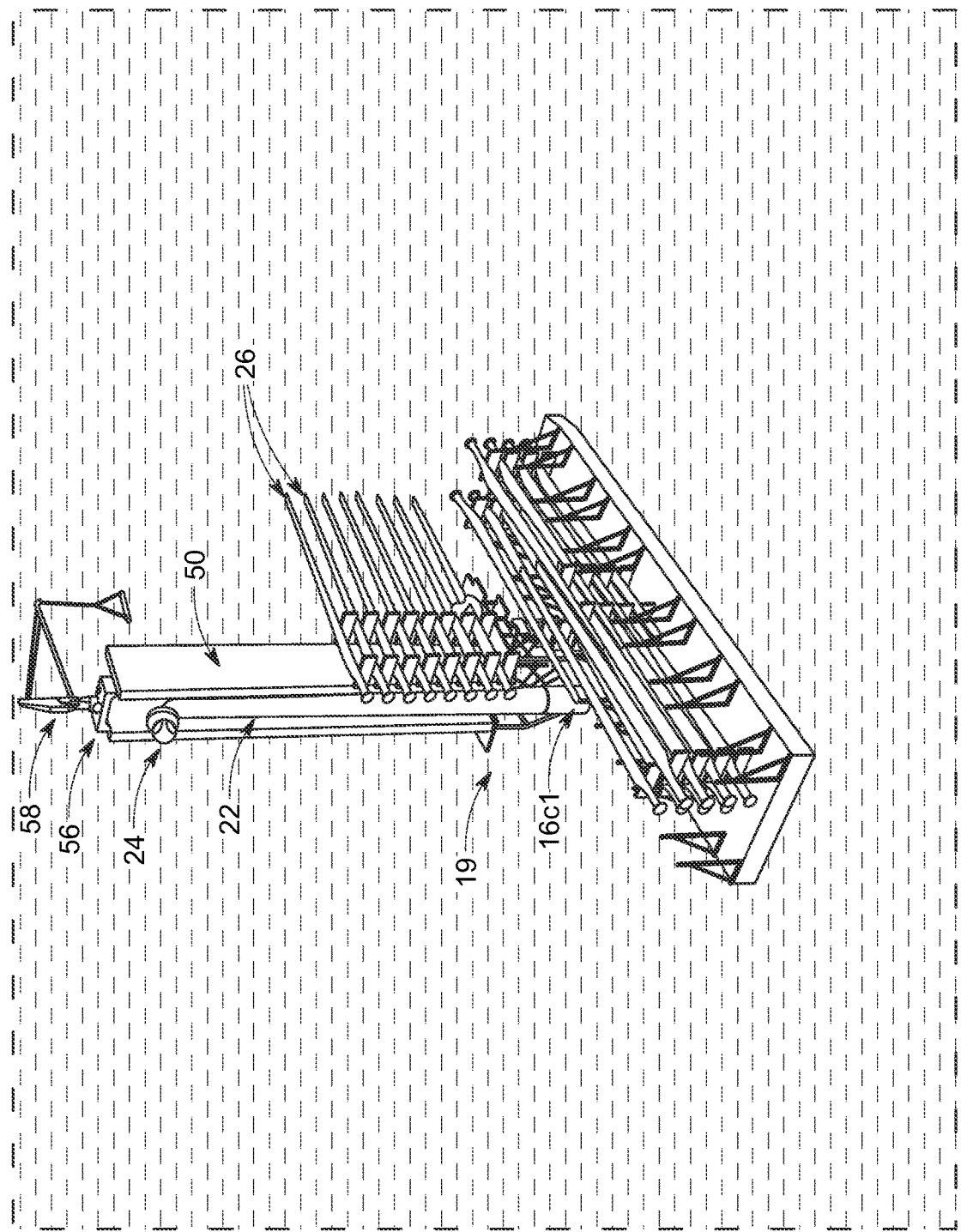
Figure 17:
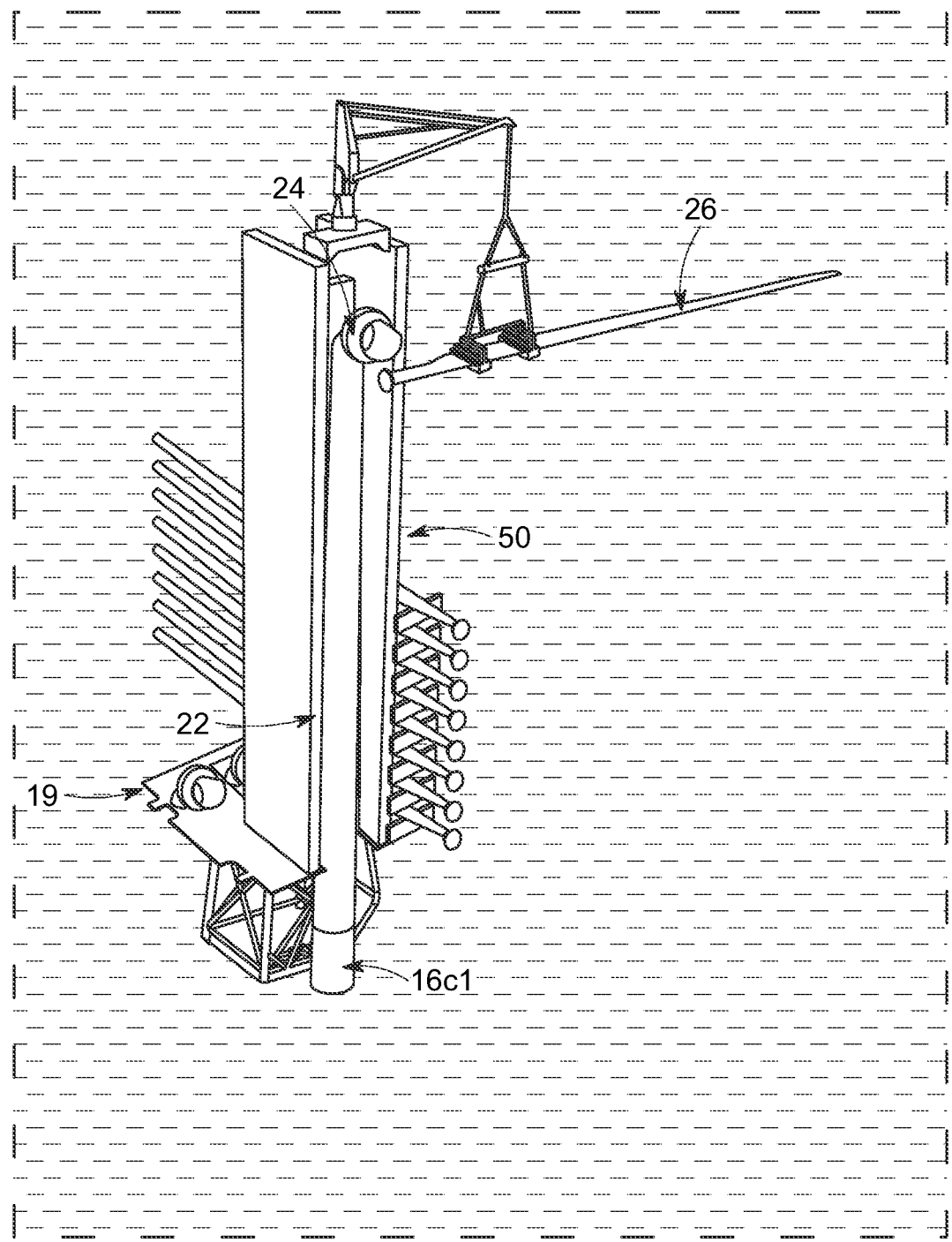

Once the fixed ballast is installed, the nacelle 24 will then be set on top of the Tower (FIGS. 14 and 15), followed by the blades 26 (FIGS. 16 and 17).

The jacket 19 will be continuously supplied with nacelles 24 on barges (FIG. 14) and staged on deck and skid into position. Blades 26 will be staged on the Tower, too (FIG. 16).

Figure 18:
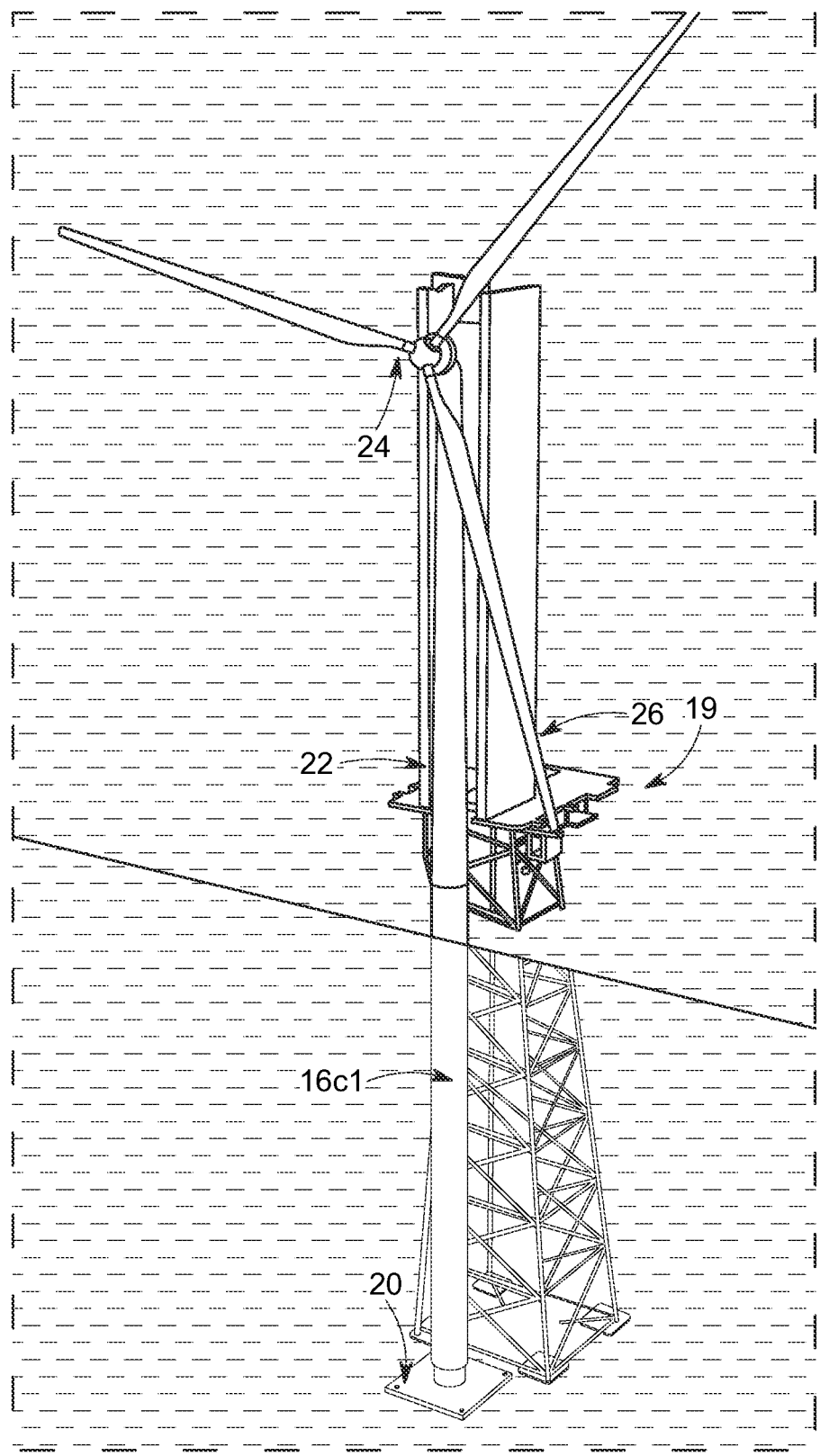
Figure 19:
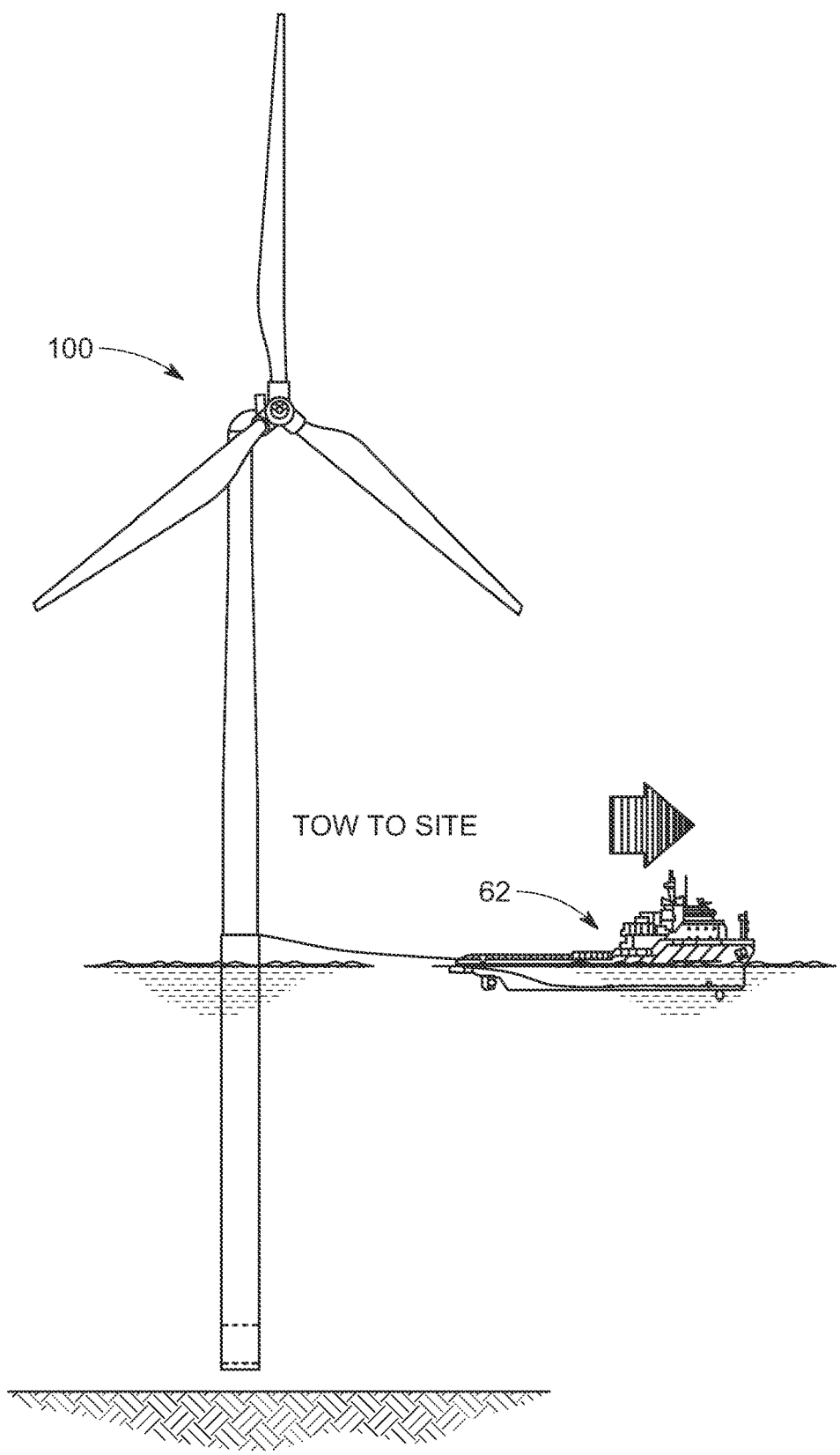
Figure 20:
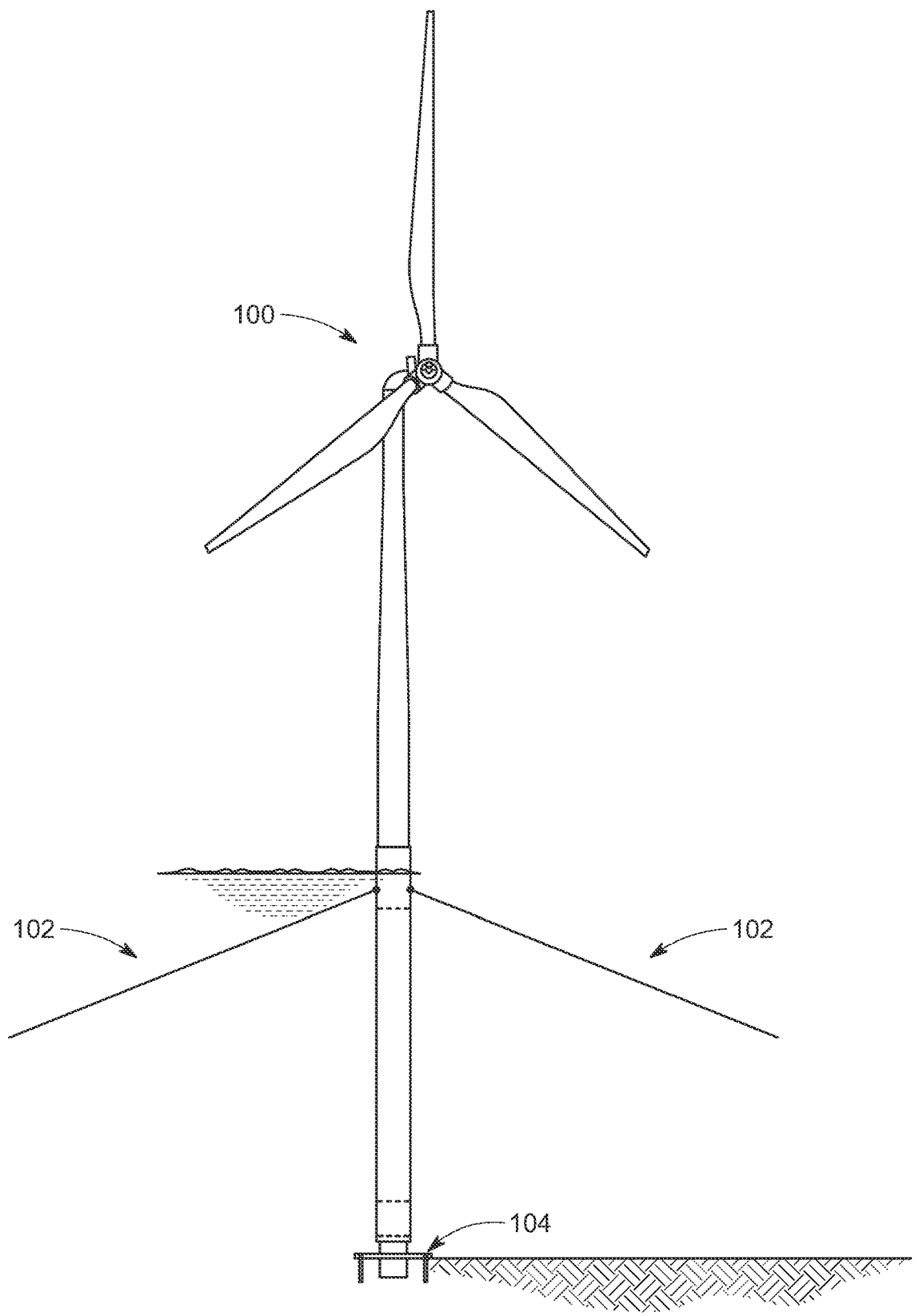

The completed floating turbine 100 is stable with nacelle and blades (in FIG. 18). The completed floating turbine 100 can be towed vertically by tug boats 62 to a final location in the wind farm 110 (in FIG. 19) for mooring and power cable hook up (in FIGS. 20 and 21). Mooring can optionally be performed using mooring lines 102 and/or piles 104 driven into the seafloor.

The claimed invention is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A method of constructing a self-erecting lift structure capable of assembling an off-shore wind turbine system, the method comprising:
    providing a platform positioned above sea level and secured to a seafloor at a first off-shore location;
    providing an installation base on the seafloor adjacent to the first off-shore location, wherein the installation base is configured to be releasably connected to a floating vessel of the off-shore wind turbine system; and
    providing the self-erecting lift structure positioned on the platform, the self-erecting lift structure including:
        an elevator tower, the elevator tower including a stack of tower modules, each of the tower modules including a guide portion, the guide portion of each of the tower modules being aligned with a guide portion of another tower module;
        a traveling cradle beam coupled to at least one guide portion of the elevator tower; and
        a crane supported by the traveling cradle beam.

2. The method of claim 1 wherein the installation base is a suction pile anchored into the seafloor.

3. The method of claim 1 wherein the platform is a fixed jacket structure.

4. The method of claim 1 wherein the platform is a jack-up structure.

5. The method of claim 1 wherein providing the self-erecting lift structure comprises:
    lifting a first tower module using the crane;
    coupling the first tower module to a top of a first stack of tower modules so that a guide portion of the first tower module is aligned with a guide portion of the first stack of tower modules;
    raising the traveling cradle beam along the guide portion of the first tower module.

6. The method of claim 1 wherein the guide portion of at least one of the tower modules includes a ratcheting mechanism.

7. The method of claim 1 further comprising disassembling the self-erecting lift structure.

8. The method of claim 1 further comprising providing an off-shore substation on the platform, wherein the off-shore substation is configured to collect and export the power generated by turbines through submarine cables.

9. A method of assembling an off-shore wind turbine system, the method comprising:
    towing a floating vessel of the off-shore wind turbine system;
    securing the floating vessel to a platform located a first off-shore location;
    lowering the floating vessel so that the floating vessel connects to an installation base provided on a seafloor adjacent to the first off-shore location;
    mounting a nacelle and blades on the floating vessel while the floating vessel is secured to the platform; and
    disconnecting the floating vessel from the installation base after the nacelle and the blades are mounted on the floating vessel to raise the floating vessel, the nacelle, and the blades.

10. The method of claim 9 wherein lowering the floating vessel includes introducing a solid ballast material into the floating vessel.

11. The method of claim 9 wherein the floating vessel comprises a spar, a buoyant tower, or an equivalent thereof, and wherein the floating vessel is towed horizontally to the first off-shore location.

12. The method of claim 11 further comprising upending the floating vessel at the first off-shore location.

13. The method of claim 12 further comprising connecting a tower to the floating vessel prior to towing the floating vessel of the off-shore wind turbine system to the first off-shore location.

14. The method of claim 12 further comprising connecting a tower to the floating vessel after upending the floating vessel at the first off-shore location.

15. The method of claim 12 further comprising connecting a tower to the floating vessel before upending the floating vessel at the first off-shore location.

16. The method of claim 12 wherein the floating vessel includes an air over water ballast tank, and wherein upending the floating vessel includes flowing seawater into the air over water ballast tank or flooding the air over ballast tank with seawater.

17. The method of claim 16 wherein disconnecting the floating vessel from the installation base comprises pumping compressed air into the floating vessel.

18. The method of claim 11 wherein the platform structure includes a fork having two prongs, a bumper located between the two prongs, and a pulling system configured to pull the floating vessel against the bumper.

19. The method of claim 18 wherein the fork having two prongs includes a cowcatcher.

20. The method of claim 18 wherein the platform includes a fixed jacket structure and wherein the fork is coupled to the fixed jacket structure or the platform.

21. The method of claim 9 wherein the floating vessel comprises a semi-submersible or an equivalent thereof.

22. The method of claim 21 further comprising mounting a tower on the floating vessel while the floating vessel is secured to the platform and prior to mounting the nacelle and the blades on the floating vessel.

23. A method of assembling an off-shore wind turbine system, the method comprising:
   constructing a floating vessel by welding together a plurality of sections, each of the sections including a cylindrical plate and a stiffening ring welded inside the cylindrical plate, and two bulkheads;
   towing the floating vessel on a barge to a first location;
   submerging the barge so that the floating vessel floats horizontally on the sea surface;
   towing the floating vessel to a platform located off-shore;
   mounting a nacelle and blades on the floating vessel while the floating vessel is secured to the platform; and
   towing the floating vessel, the nacelle, and the blades vertically to a second off-shore location different from the first location.

24. The method of claim 23 wherein constructing the floating vessel is performed at least partially onshore in a shipyard, port, or at a quayside.

25. The method of claim 23 wherein constructing the floating vessel is performed at least partially on a submersible barge located inshore.

26. The method of claim 23 wherein the floating vessel comprises one of a spar, a floating tower, and a semi-submersible.

27. The method of claim 23 further comprising providing an off-shore substation on the platform, wherein the off-shore substation is configured to collect and export the power generated by turbines through submarine cables.

28. The method of claim 23 further comprising connecting a tower to the floating vessel prior to towing the floating vessel to the platform.

29. The method of claim 23 further comprising connecting a tower to the floating vessel before upending the floating vessel at the first location, wherein the first location is off-shore.

* * * * *